United States Patent [19]
Tanaka et al.

[11] Patent Number: 5,682,549
[45] Date of Patent: Oct. 28, 1997

[54] IMAGE DATA MANAGEMENT SYSTEM FOR ACCESSING IMAGE DATA FROM COMMUNICATION NETWORK BY READING FILE NAME INFORMATION STORED IN AN IC CARD

[75] Inventors: Kazuaki Tanaka; Shoichi Kosuge, both of Yokohama; Shigeru Yoneda, Ebina, all of Japan

[73] Assignee: Hitachi, Ltd., Tokyo, Japan

[21] Appl. No.: 49,854

[22] Filed: Apr. 20, 1993

[30] Foreign Application Priority Data

Apr. 20, 1992 [JP] Japan .................... 4-099122
Aug. 21, 1992 [JP] Japan .................... 4-222572

[51] Int. Cl.[6] ........................................ G06F 17/00
[52] U.S. Cl. .................. 395/828; 395/200.06; 395/201; 235/601; 235/606
[58] Field of Search ...................... 395/600, 425, 395/144, 164, 148, 114; 356/302, 296, 462; 364/900, 401, 920.7, 940.62, 952.1, 962, 974.7; 382/61, 40, 56, 305, 306; 380/20; 358/403

[56] References Cited

U.S. PATENT DOCUMENTS

| | | | |
|---|---|---|---|
| 4,283,621 | 8/1981 | Pembroke | 235/375 |
| 4,490,747 | 12/1984 | Yokoyama | 358/296 |
| 4,604,653 | 8/1986 | Shimizu | 358/403 |
| 4,652,733 | 3/1987 | Eng et al. | 235/462 |
| 4,653,021 | 3/1987 | Takagi | 364/900 |
| 4,739,480 | 4/1988 | Oono et al. | 364/413.13 |
| 4,748,678 | 5/1988 | Takeda et al. | 382/56 |
| 4,760,606 | 7/1988 | Lesnick et al. | 382/306 |
| 4,907,283 | 3/1990 | Tanaka et al. | 382/40 |
| 4,941,125 | 7/1990 | Boyne | 395/600 |
| 4,972,473 | 11/1990 | Ejiri et al. | 380/20 |
| 5,093,911 | 3/1992 | Parks et al. | 395/600 |
| 5,109,439 | 4/1992 | Froessl | 382/61 |
| 5,168,444 | 12/1992 | Cukor et al. | 364/401 |
| 5,173,783 | 12/1992 | Oku et al. | 358/302 |
| 5,179,649 | 1/1993 | Masuzaki et al. | 395/148 |
| 5,241,659 | 8/1993 | Parulski et al. | 395/164 |
| 5,276,780 | 1/1994 | Sugiura | 395/116 |
| 5,276,805 | 1/1994 | Hamaguchi | 395/164 |
| 5,283,667 | 2/1994 | Kojima et al. | 358/462 |
| 5,301,350 | 4/1994 | Rogan et al. | 395/800 |
| 5,319,745 | 6/1994 | Vinsonneau et al. | 395/144 |
| 5,339,412 | 8/1994 | Fueki | 395/600 |
| 5,381,526 | 1/1995 | Ellson | 395/164 |
| 5,384,900 | 1/1995 | Sato et al. | 395/100 |
| 5,404,479 | 4/1995 | Yamamoto | 395/425 |

OTHER PUBLICATIONS

Communication Technology, Nov. 1991, No. 32, pp. 17-33.

*Primary Examiner*—Thomas C. Lee
*Assistant Examiner*—Anderson I. Chen
*Attorney, Agent, or Firm*—Fay, Sharpe, Beall, Fagan, Minnich & McKee

[57] ABSTRACT

An image data management system includes a communication circuit network, and an image data input output apparatus and an image data registration apparatus connected to this communication circuit network. The image data output apparatus includes an image input device for taking in information represented on paper as image data, a management information input device for reading image data management information from a portable memory device, the image data management information being needed to register and manage image data inputted from the image input device, an input device for inputting command information given by a user, and an input output processing device for processing image data inputted from the image input device and sending processed image data onto the communication circuit network, on the basis of the command information inputted from the input device and the image data management information read from the management information input device. The image data registration apparatus includes a memory device for registering image data sent from the image data input output apparatus, and an image data registering device for taking in image data on the communication circuit network, providing image data thus taken in with search information needed at the time of searching the image data, and registering the image data with the search information attached thereto in the memory device.

21 Claims, 24 Drawing Sheets

DATA FORMAT IN SMALL CARD

FIG. 4

SERVICE ITEMS

1. IMAGE DATA INPUTTING

2. IMAGE DATA OUTPUTTING

3. IMAGE DATA CIRCULATION

FIG. 6

| FILE NAME LIST | | |
|---|---|---|
| 1 | FILE A | ENCRYPTION |
| 2 | FILE B | — |
| 3 | FILE C | ENCRYPTION |

FIG. 7

INPUT MANAGEMENT TABLE
601

| | |
|---|---|
| SYSTEM FILE NAME | 615 |
| NETWORK ADDRESS | 617 |
| SMALL CARD OWNER' S IDENTIFIER | 603 |
| DATA FORMAT | 619 |
| SECRET KEY | 621 |
| DATE AND HOUR OF IMAGE DATA INPUTTING | 605 |
| IMAGING DEVICE IDENTIFIER | 607 |
| THE NUMBER OF SLAVE FILES | 623 |
| SLAVE SYSTEM FILE NAME (625) \| NETWORK ADDRESS (627) | |
| ⋮ \| ⋮ | |
| SENT PAGE NUMBER | 609 |
| INSERTING PAGE NUMBER | 611 |
| THE NUMBER OF INSERTING PAGES | 613 |

FIG. 10

RECEIVED MESSAGE

| MESSAGE CLASSIFICATION | RETURN CODE | THE NUMBER OF DOCUMENT NAMES | DOCUMENT CLASS | DOCUMENT NAME INVOLVED CHARACTER STRING | DOCUMENT NAME INVOLVED IMAGE DATA | SMALL CARD OWNER'S IDENTIFIER | DATE AND HOUR OF IMAGE DATA INPUTTING | IMAGING DEVICE IDENTIFIER | SYSTEM FILE NAME | NETWORK ADDRESS | |
|---|---|---|---|---|---|---|---|---|---|---|---|
| 903 | 905 | 907 | 909 | 911 | 913 | 915 | 917 | 919 | 921 | 923 | |

FIG. 11

DOCUMENT NAME LIST

1. DOCUMENT A

2. DOCUMENT B

IMAGE DATA PROCESSING MANAGEMENT TABLE

| 1601 — DOCUMENT NAME CLASS | DOCUMENT NAME — 1603 |
|---|---|
| SMALL CARD OWNER'S IDENTIFIER | — 1605 |
| DATA AND HOUR OF IMAGE DATA INPUTTING | — 1607 |
| IMAGE DEVICE IDENTIFIER | — 1609 |
| NUMBER OF SLAVE FILES | — 1610 |
| 1617 — SYSTEM FILE NAME OF SLAVE FILE | NETWORK ADDRESS OF SLAVE FILE — 1619 |

| 1611 — PAGE NUMBER | START FLAG | IMAGE DATA SEARCH KEY — 1615 |
|---|---|---|
| | 1613 | |

FIG. 20

IMAGE DATA MANAGEMENT RECORD
HAVING MASTER FILE FORMAT

| DOCUMENT NAME CLASS | DOCUMENT NAME | SMALL CARD OWNER'S IDENTIFIER | DATE AND HOUR OF IMAGE DATA INPUTTING | IMAGING DEVICE IDENTIFIER | MASTER-SLAVE FLAG | TOTAL NUMBER OF PAGES | PAGE NUMBER | |
|---|---|---|---|---|---|---|---|---|
| | | | | | | | ~1817 | |
| | | | | | | | ·········· | |
| | | | | | | | SEARCH KEY OF FIRST PAGE OF IMAGE DATA ~1819 | |

1803, 1805, 1807, 1809, 1811, 1813, 1815

IMAGE DATA MANAGEMENT RECORD
HAVING SLAVE FILE FORMAT

FIG. 27

DATA FORMAT IN SMALL CARD

| SMALL CARD OWNER'S IDENTIFIER | NUMBER OF DATA BASES | DATA BASE NAME FOR DISPLAY | REGISTERING DATA FORMAT | SECRET KEY FOR ELECTRONIC CERTIFICATION | DATA BASE NAME FOR SYSTEM | NETWORK ADDRESS | THE NUMBER OF TABLES | DISPLAY TABLE NAME | SYSTEM TABLE NAME | --- | THE NUMBER OF COLUMNS | DISPLAY COLUMN NAME | SYSTEM COLUMN NAME | --- | --- |
|---|---|---|---|---|---|---|---|---|---|---|---|---|---|---|---|
| 2503 | 2505 | 2507 | 2509 | 2511 | 2513 | 2515 | 2517 | 2519 | 2521 | | 2523 | 2525 | 2527 | | |

5,682,549

IMAGE DATA MANAGEMENT SYSTEM FOR ACCESSING IMAGE DATA FROM COMMUNICATION NETWORK BY READING FILE NAME INFORMATION STORED IN AN IC CARD

BACKGROUND OF THE INVENTION

The present invention relates to management of image data in an information processing system, and in particular to an image data management system for managing image data read from a facsimile or a reproducer.

As an example of a conventional method for converting information written on paper into image data which can be processed in a computer, transferring the image data to a memory via a communication circuit network, and recording the image data therein, a method using facsimile mail and a computer interlocked therewith is disclosed in Communication Technology, 1991, November., No. 32. Such a technique has been devised considering that image data are sent nearly simultaneously from, for example, many facsimile devices located in branches and business offices to a memory device of a computer system located in a head office and the same image data recorded in a computer system of a head office is sent simultaneously to branches. Therefore, such a technique does not provide manipulation suitable for individuals to convert information on paper to image data and record and manage the image data in order to achieve paperless processing of office business.

Besides this, there has been also realized a reproducer having a function of converting information written on paper to image data which can be processed by a computer and writing the image data on a memory device such as a floppy disk. In such devices, it was left to users to determine how recorded image data should be are used and managed.

SUMMARY OF THE INVENTION

An object of the present invention is to provide an image data management system capable of taking in information written on paper as image data and recording or outputting easily the image data as individual data in order to promote paperless office business.

Therefore, an image data management system according to the present invention includes a communication circuit network, an image data input output apparatus connected to this communication circuit network, and an image data registration apparatus. The image data input output apparatus includes an image input device for taking in information written on paper as image data, a management information input device for reading image data management information, which is needed to store and manage image data inputted from the image input device, from a portable memory device, an input device for inputting command information fed from the user, and an input output processing device for processing the image data inputted from the image input device and sending the processed image data to the communication circuit network on the basis of the command information inputted from the input device and the image data management information read by the management information input device. The image data registration apparatus includes a memory device for registering the image data sent from the image data input output apparatus, and a memory processing device for taking in the image data on the communication circuit network, providing the image data thus taken in with retrieval information needed at the time of retrieving the image data, and storing resultant data in a memory device.

According to an image data management system of the present invention, information written on paper is taken into the image data input output apparatus as image data which can be processed by a computer. Only image data management information stored in a portable memory device such as an IC disk and command information, such as a file name, specified by the user are inputted. Management of information for discriminating the image data in the network system is exercised automatically by the system. Therefore, it is not necessary for the user to remember address information, such as network address or directory hierarchy, needed for generalization, or to remember manipulation for remote logging-in or allocation. As a result, it is possible to easily store image data in a memory device connected to the network, manage the image data, or take out the image data.

BRIEF DESCRIPTION OF THE DRAWINGS

FIG. 4 is a configuration diagram showing an example of a display picture of service items;

FIG. 6 is a configuration diagram showing an example of a display picture of a file name list;

FIG. 7 is a logical configuration diagram of an input management table;

FIG. 10 is a logical configuration diagram of a message sent from an image data registration apparatus;

FIG. 11 is a configuration diagram showing an example of a display picture of a document name list;

FIG. 18 is a logical configuration diagram of an image data processing management table;

FIG. 20 is a logical configuration diagram of an image data management record having a master file format;

FIG. 27 is a logical configuration diagram of information stored in a small card which is used in a third embodiment of the present invention.

DESCRIPTION OF THE PREFERRED EMBODIMENTS

Figure 1:
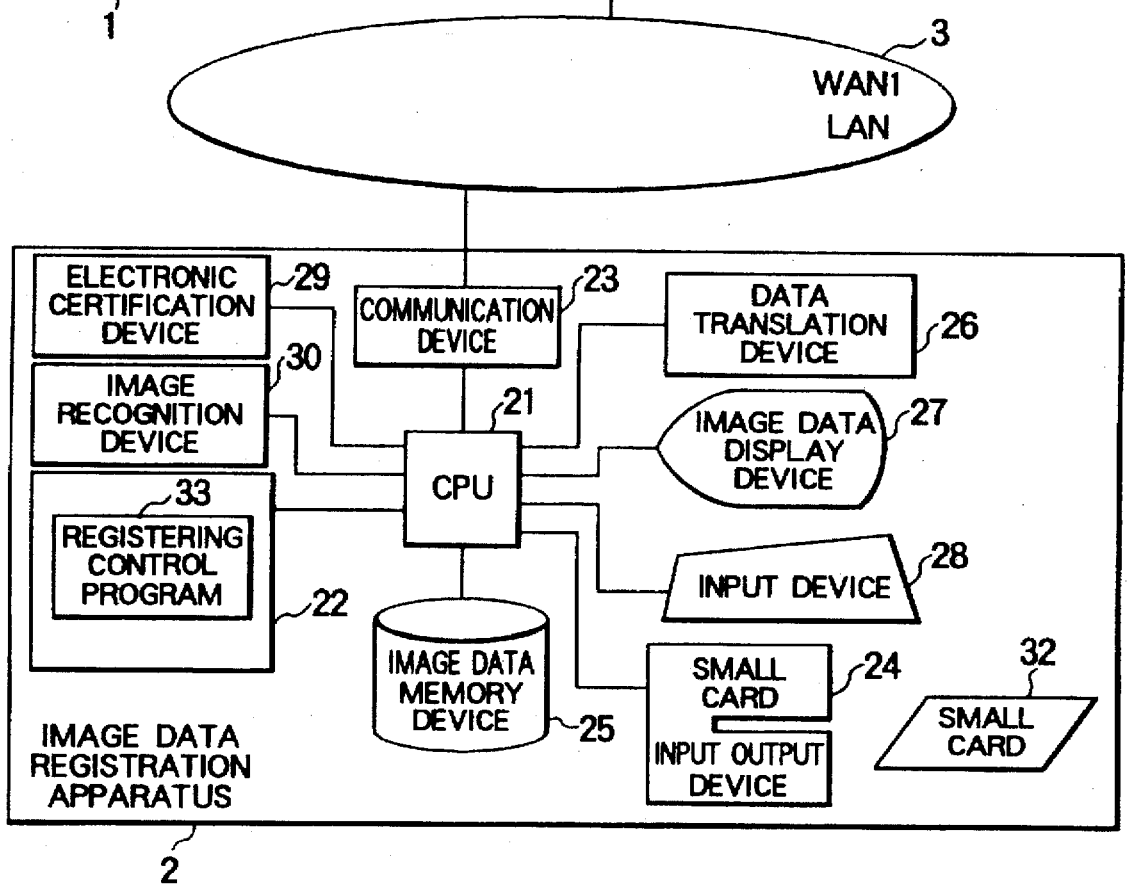
FIG. 1 is an entire configuration diagram of an image data management system of a first embodiment of the present invention.

FIG. 1 is a configuration diagram showing the entire configuration of an embodiment of an image data management system according to the present invention.

In FIG. 1, numeral 1 denotes an image data input output apparatus, and numeral 2 denotes an image data registration apparatus. Numeral 3 denotes a network, such as a wide area network (WAN), a local area network (LAN), a public communication circuit network, or a specific communication circuit network, connecting the image data input output apparatus 1 to the image data registration apparatus 2.

The image data input output apparatus 1 includes a central processing unit (CPU) 11, a memory 12, a communication device 13 for transferring information via the network 3, a small card reader 14 for reading information recorded on a small card 30, an image data input output device 15 such as a reproducer or a facsimile device, a data translation device 16, a display device 17, an input device 18, and an electronic certification device 19.

In the memory 12, an input output program 31 to be executed by the CPU 11 and various kinds of information to be used in image data processing are held. The data translation device 16 translates the format of the image data inputted from the image data input output device 15 into a data format suitable for processing in the present system. As data format translation done by the data translation device 16, there is translation of image data of facsimile data format into a data format peculiar to application using the image data, translation of color image data into monochrome image data, or data compression for reducing the amount of data transmitted to the network 3. The electronic certification device 19 encrypts image data in transmitting inputted image data to the image data registration apparatus 2 or decrypts encrypted image data sent from the image data registration apparatus 2.

The image data registration apparatus 2 includes a communication device 23 for transferring image information via a CPU 21, a memory 22 and the network 3, a small card input output device 24 for recording various kinds of information on a small card 32 or updating recorded information, an image data memory device 25, a data translation device 26, an image data display device 27, an input device 28, an electronic certification device 29, and an image recognition device 30.

In the memory 22, a registering control program 33 to be executed by the CPU 21 and various kinds of information to be used in image data processing are held. The image recognition device 30 recognizes image data and translates the image data into code data or figure data. As the image data memory device 25, a memory device such as an optical disk device, a magnetic disk device, or a magnetic tape library unit.

In FIG. 1, one image data input output apparatus 1 and one image data registration apparatus 2 are connected to the network 3. However, a plurality of image data input output apparatuses 1 and a plurality of image data registration apparatuses 2 may be connected to the same network 3. Although not especially illustrated, memory areas of various kinds of information, such as a memory area of image data and file names and a work area needed for program execution, are provided in each of the memories 12 and 22.

On the small card 32, various kinds of information to be used for managing image data in the present system are recorded. An example of a format of information recorded on the small card 32 is shown in FIG. 2.

Figure 2:
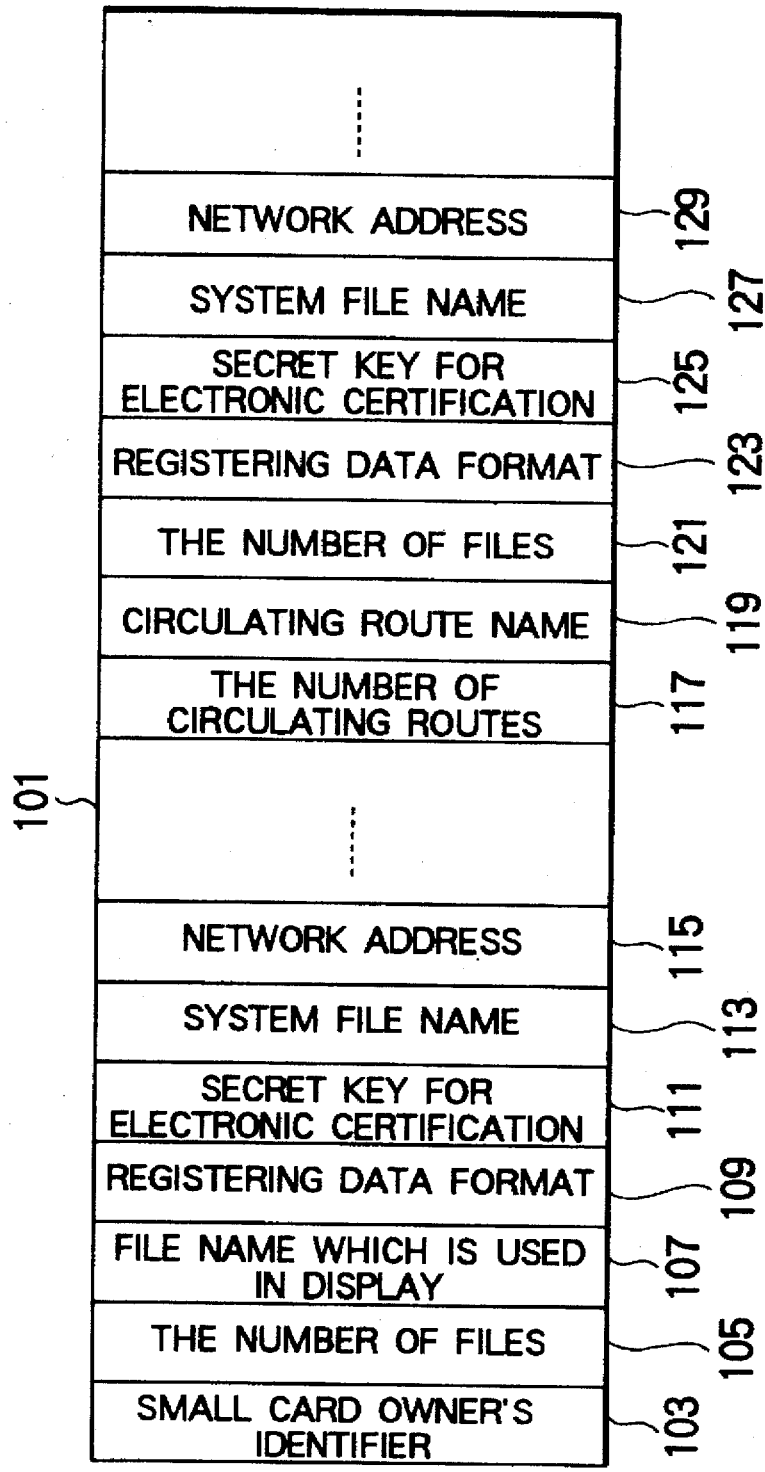
FIG. 2 is a logical configuration diagram of information stored in a small card.

As exemplified in FIG. 2, the small card 32 contains a small card owner's identifier 103, the number 105 of files managed by this small card, a file name 107 which is used in displaying, a data format 109 which is used for registering image data, a secret key 111 for electronic certification, an address 115 on the network of the image data registration apparatus 2 having an image data memory device 25 storing the file, and a system file name 113 containing a directory hierarchy and a file which are used in the operating system. File names 107, registering data formats 109, secret keys for electronic certification 111, system file names 113, and network addresses 115 are respectively set for as many as the number of files 105. Secret keys for electronic certification may be common to files or may vary with files. The small card 32 may further include the number of circulating routes 117 and circulating route names 119. For each circulating route name, the number of files 105, a registering data format 109, a secret key for electronic certification 111, a system file name 113, and a network address 115 may be set.

As for the registering data format 109, there is, for example, a facsimile data format, an image data format peculiar to application, a color image format, a monochrome image data format, a character data format, a figure data format, an audio data format, a video data format, or a text data format having them as components.

In the present embodiment, a small card is used as the memory device for recording those kinds of information. However, this memory device is not limited to the small card, but any memory device may be used so long as it is portable.

Hereafter, the case where image data are recorded as one record of a file having a specified file name will be described. In case image data are to be handled as one component, such as a field, of a record in a file, however, it can be done by storing the field name thereof together with the file name on the small card, replacing the processing with a file taken as the unit by processing with a file and a field taken as the unit, and recording the image data as a field value of a record in a specified file. Thereby, the image data can be registered into the file as a one-field value.

Figure 3:
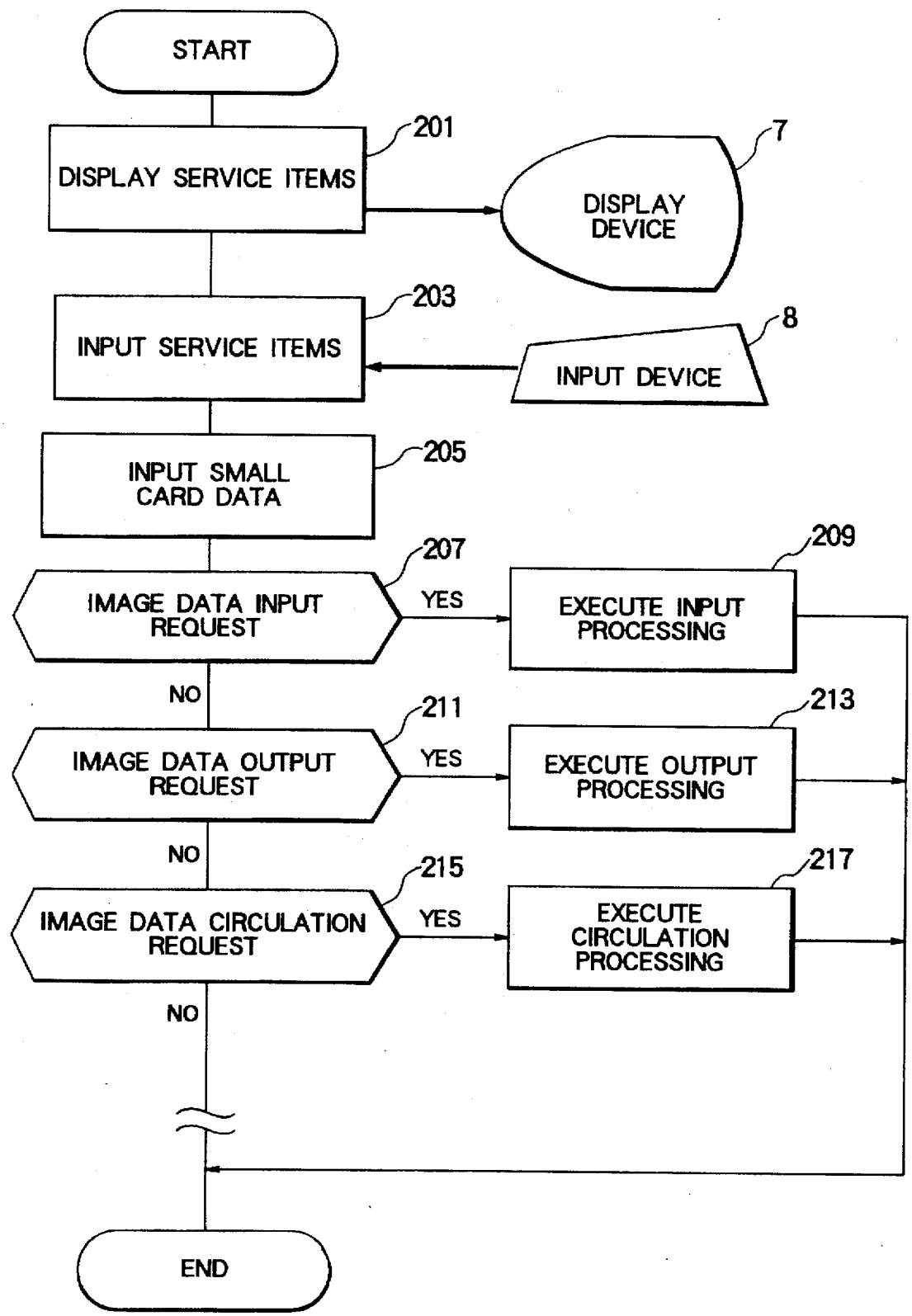
FIG. 3 is a flow chart of an input output processing program.

FIG. 3 is a flow chart showing the processing flow of the input output program 32 to be executed by the CPU 11 in the image data input output system 1.

In response to manipulation of an operation button provided in the image data input output device 15 by the user, automatic repetition of the manipulation, or slipping the small card 32 into the small card reader 14, the CPU 11 starts execution of the input output program 32.

First of all, the CPU 11 displays service items as shown in FIG. 4 on the display device 17 (step 201). The present embodiment will now be described by taking each service of image data inputting, outputting and circulation as an example of a service item. After displaying the service item, the CPU 11 receives a service request of the user from the input device 18 (step 203), and reads data recorded on the small card 32 by using the small card reader 14 (step 205). If the small card 32 is not in the small card reader 14, the CPU 11 urges the user to slip the small card 32 into the small card reader 14 via the display device 17.

Then the CPU 11 determines whether the received service request is an image data input request (step 207). If the inputted service request is an input request at the step 207, input processing for transferring image data read from the image data input output device 15 to the image data registration apparatus 2 via the communication device 13 is executed (step 209).

If the result of decision at the step 207 is "no", it is then determined whether the service request is an image data outout request (step 211). If the result of decision at the step 211 is "yes", output processing is executed to take in image data from the image data registration apparatus 2 via the network 3 and print and output the image data by using the image data input output device 15 (step 213).

If the result of decision at the step 207 is "no", it is determined whether the service request is an image data circulation request (step 215). If the result of decision at the step 215 is "yes", circulation processing is executed to transfer image data inputted from the image data input output device 15 to a plurality of image data registration apparatuses 2, which are connected to the network 3, via the network 3 (step 217).

If the result of decision at the step 215 is "no", processing is finished as it is. However, other arbitrary processing may be executed.

The input processing 209, output processing 213, and circulation processing 217 will hereafter be described in detail.

Figure 5:
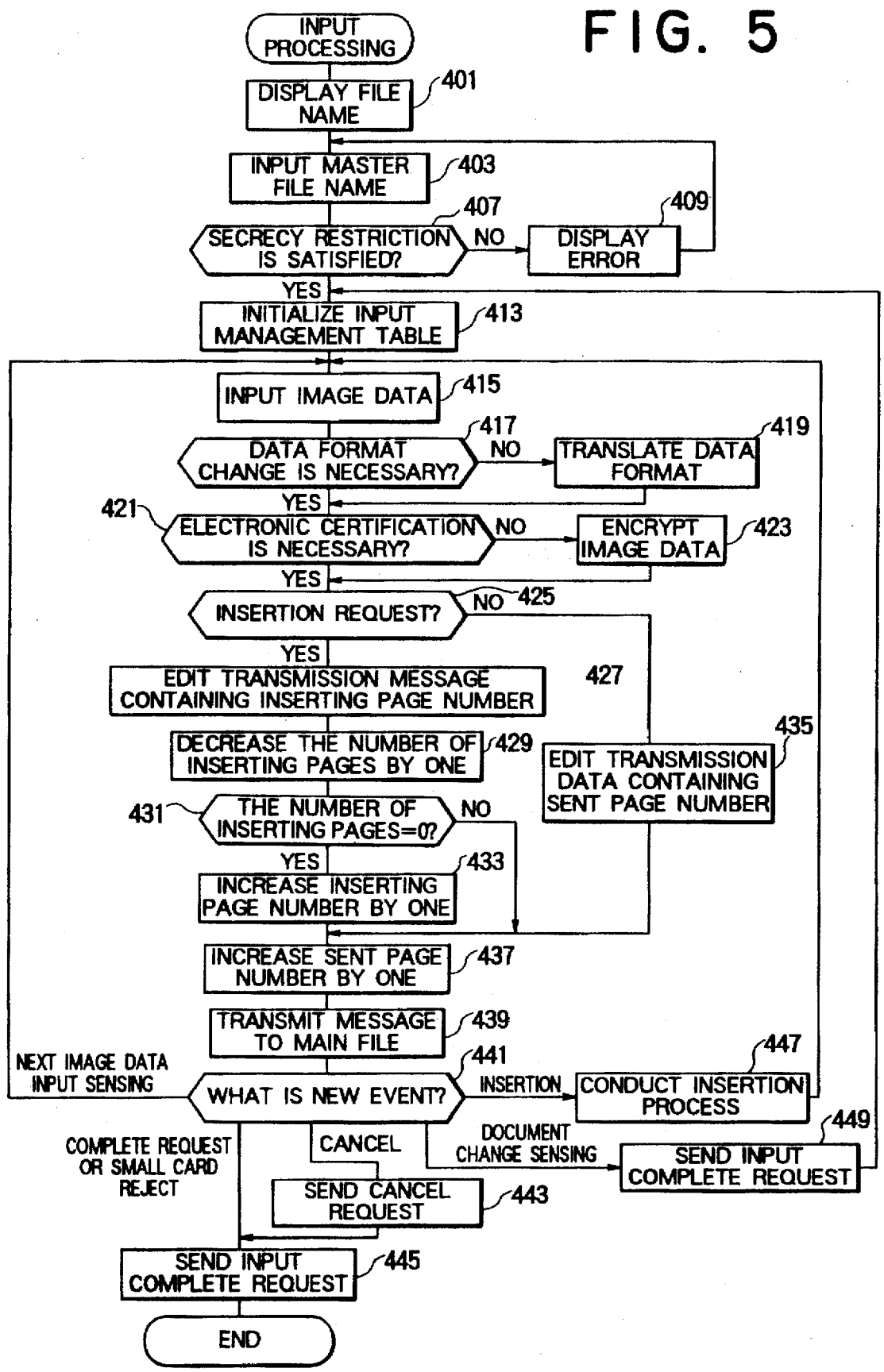
FIG. 5 is a flow chart of an image data inputting module included in an input output program.

FIG. 5 is a flow chart showing details of processing of the input processing 209.

In the input processing, the file name 107 recorded on the small card 32 is first read from the small card reader 14 and displayed on the display device 17 (step 401). An example of display of the file name 107 is shown in FIG. 6. Here, "FILE A", "FILE B" and "FILM C" are displayed together with numerals "1", "2" and "3" for selection, respectively. The "FILE A" and "FILE C" are displayed together with "ENCRYPTION", which means that image data to be stored in the file is encrypted, transferred to the image data registration apparatus 2, and stored therein.

The system may be adapted to allow specifying whether encryption should be performed or not for each individual image data included in the file.

Inputting a master file name and a slave file name from the keyboard 8 by the user is accepted (step 403). In the master file, the image data themselves are stored. In the slave file, the location information of the master file is stored. As for the method for specifying them, a method of using a file specified first as the master file and using a file specified subsequently as the slave file may be adopted. Alternatively, a file name may be specified together with information, which makes it possible to distinguish between the master file and the slave file. A file name specified by the user is displayed with emphasis mode on the display device 17 in order to facilitate confirmation. The emphasis mode is implemented by blinking the pertinent file name, changing the brightness, or making a display with white and black inverted. In order to establish a distinction between the master file and the slave file, color or brightness may be changed between them or a different emphasis method may be used.

Subsequently, it is checked whether secrecy condition is satisfied for the file specified by the user (step 407). Here, it is determined whether there is not a contradiction in the secrecy condition, such as a contradiction that the master file is not an encrypted file whereas the slave file is an encrypted file, or a contradiction that two or more master files are specified and only a part thereof is an encrypted file. If there is a contradiction in the secrecy condition, that fact is displayed on the display device 17 and processing returns to the step 403 to accept inputting a file name again.

If there is not a contradiction in secrecy condition of the file at the step 407, an input management table is initialized (step 413).

FIG. 7 shows an example of the logical configuration of the input management table. As shown in FIG. 7, the input management table 601 includes a small card owner's identifier 603, date and hour 605 of image data inputting, an imaging device identifier 607, a sent page number 609, an inserting page number 611, the number 613 of inserting pages, a system file name 615 of master file, a network address 617, a registering data format 619, a secret key 621, the number 623 of slave files, a system file name 625 of slave file, and a network address 627. At step 413, data in the small card corresponding to the master file and slave file specified by the user are copied and set into the small card owner's identifier 603, system file name 615 of master file, network address 617, registering data format 619, secret key 621, the number 623 of slave files, system file name 625 of slave file, and network address 627. In the date and hour 605 of image data inputting, the value of a timer provided in a computer apparatus forming the image data input output apparatus 1 is set. In the imaging device identifier 607, information is set by the user when the input output program 31 is installed. Alternatively information stored beforehand in a nonvolatile memory (not illustrated) included in the image input output apparatus 1 is read out and set in the imaging device identifier 607. In the sent page number 609, "1" is set as the initial value. In the inserting page number 611 and the number 613 of inserting pages, "0" is set as initial values.

Then image data are inputted from the image data input output device 15 (step 415). It is determined whether a data format has already been set in the registering data format 619 included in the input management table 601 (step 417). If the result of the decision is "yes", the image data format is translated by the data translation device 16 so as to match with the data format set in the registering data format 619 (step 419). Since the present invention does not depend upon the data translation method in the step 419, description of the data translation method will be omitted.

Subsequently, it is determined whether a secret key to be used for encryption of the image data has already been set in the secret key 621 included in the input management table 601 (step 421). If the result of decision at the step 421 is "yes", the secret key 621 and the image data are sent to the electronic certification device 19 and encrypted (step 423). The present invention does not depend upon the encryption method. Various encryption methods heretofore known can be used.

Figure 8:
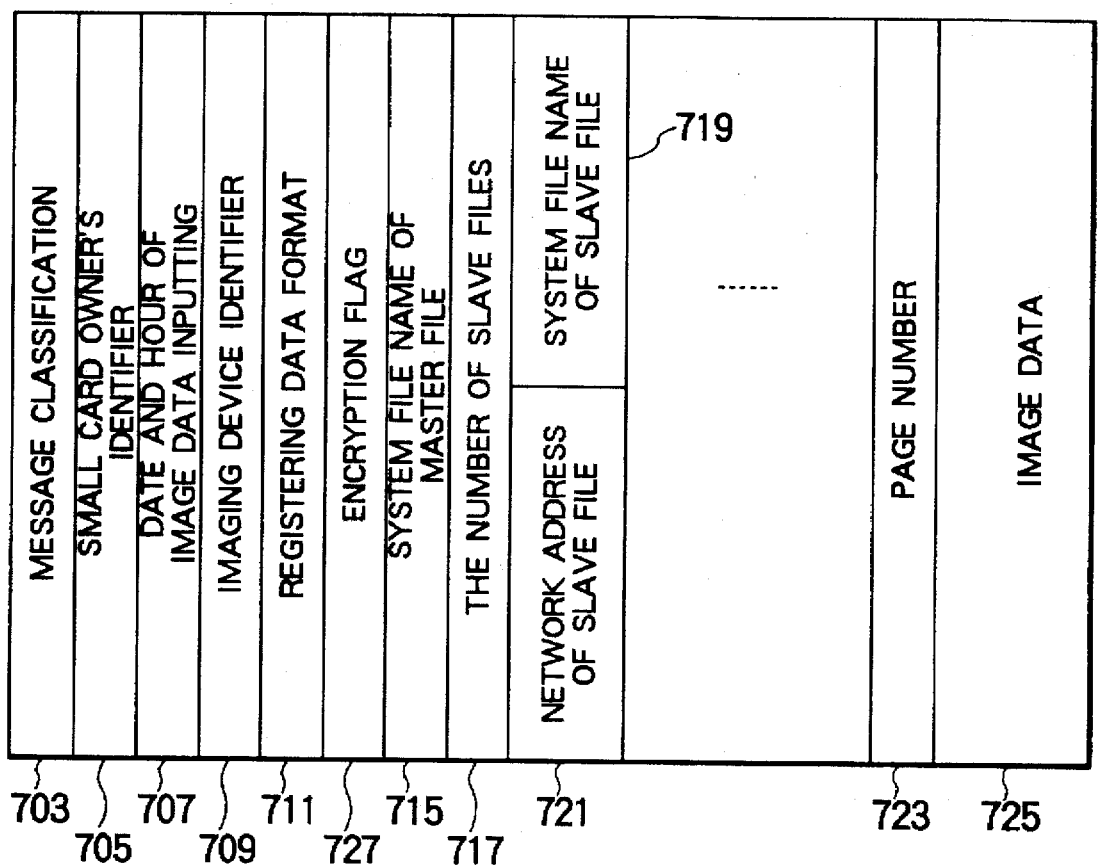
FIG. 8 is a logical configuration diagram of a message sent at the time of registering a request.

Then the number 613 of inserting pages included in the input management table 601 is examined. It is determined whether the value set therein is at least one, i.e., the current input processing involves insertion processing (step 425). If the result of decision is "yes", a transmission message containing the inserting page number 611 included in the input management table 601 is edited (step 427). FIG. 8 shows an example of logical configuration of a transmission message. As exemplified in FIG. 8, a transmission message 700 includes a message classification 703, a small card owner's identifier 705, date and hour of image data inputting 707 representing the date and hour when one sheet has been read in the beginning of image data forming one document, an imaging device identifier 709, a registering data format 711, a system file name 715 of master file, the number 717 of slave files, a system file name 719 of slave file, a network address 721, a page number 723, and image data 725. In the input processing, a value indicating a registration request is set in the message classification 703 of the transmission message 700 to be edited.

If the transmission message editing has been finished, the number 613 of inserting pages is decreased by one (step 429). It is determined whether the number 613 of inserting pages has become 0 (step 431). If the number 613 of inserting pages has become 0, one is added to the inserting page number 611 (step 433). If the number 613 of the inserting pages is not 0, processing proceeds directly to step 437.

If the result of decision at the step 425 is "no", the transmission message containing the sent page number 609 of the input management table 601 is edited in the page number 723 and processing proceeds to step 437 (step 435).

At step 437, one is added to the sent page number 609 (step 437). Thereafter, the transmission message is sent to the image data registration apparatus 2 having a main file via the network 3 by the communication device 13 (step 439).

After the transmission message has been sent, occurrence of a new event is awaited and it is determined what is the event (step 441). In the present embodiment, next image data input sensing, input complete command from the user, cancel command, document change sensing or command, and insert command will now be described as new events.

If the new event which has occurred at the step 441 is sensing the next image data input from the image data input output device 15, then processing returns to the step 415 and processing subsequent to this is repeatedly executed. If the new event is the input complete command from the user or small card reject sensing, then an input complete request is sent to the image data registration apparatus 39 having a main file and processing is finished (step 445). At step 445, a value indicating the input complete request is set in the message classification 703 of the transmission message and sent to the network 3. At this time, the same values as those of registration processing are set in the small card owner's identifier 705 to the imaging device identifier 709 of the transmission message. In the present request, data of the registering data format 711 of the transmission message and data subsequent thereto are invalid.

If the new event at the step 441 is the cancel command of the image data under registration given by the user, then a cancel request is sent to the image data registration apparatus 2 having a main file (step 443), an input complete request is sent, and processing is finished (step 445). At step 443, a value indicating a cancel request is set in the message classification 703 of the transmission message and the same values as those of registration are set in the small card owner's identifier 705 to the imaging device identifier 709. In the same way as the input complete request, data of the registering data format 711 in the transmission message and data subsequent thereto are invalid in the present request.

If it is detected at the step 441 that the document of image data consecutively read has been changed, then an input complete request similar to that in the transmission message sent at the step 445 is sent to the image data registration apparatus 2 having a main file, thereafter processing returns to the step 413 (step 449), and image data input processing is continued for a new document. As for the method for informing the CPU 11 of document change, the user may depress a document changeover switch provided in the image data input output device 15. Alternatively the CPU 11 may be informed of changeover when the image data input output device 15 has detected a change in read image data, for example, from a longitudinally long shape to a laterally long shape or a change in size of one page of image data.

If the new event determined at the step 441 is an insertion request, then insertion processing (step 447) is executed and thereafter processing of the step 415 and steps subsequent thereto is repeated.

Figure 9:
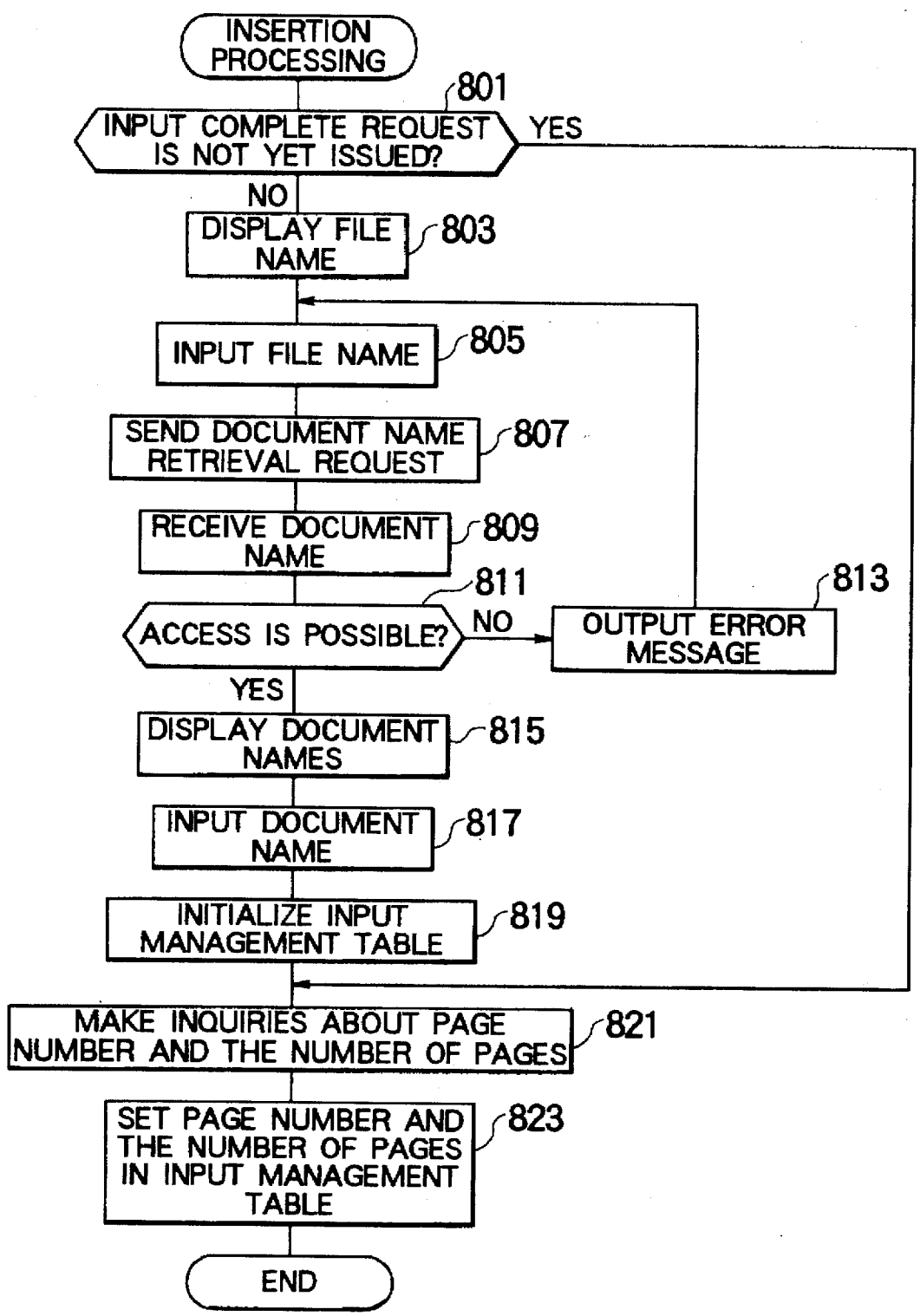
FIG. 9 is a flow chart of an image data inserting module included in the input output program.

The insertion processing will hereafter be described in detail by referring to FIG. 9.

In the insertion processing, it is first determined whether the input management table has already been made, i.e., whether an input request has been made when image data of a plurality of pages are being inputted and an input complete request is not yet made (step 801). If the result of decision at the step 801 is "no", then the request is an insertion request for a file already registered, and the file name registered on the small card 32 is displayed on the display device 17 in order to accept specification of a subject file (step 803). Subsequently, specification of a file name by the user is accepted (step 805). A request for a document name included in the specified file is sent to the image data registration apparatus 2 having the file (step 807). At this time, information indicating a document name retrieval request is set in the message classification 703 of the transmission message to be transferred to the image data registration apparatus 2. In the small card identifier 705 and the system file name 715 of the master file, corresponding data included in the small card are set. In the present request, other items of the transmission message are invalid.

Then, a message for specifying the document, such as document names, small card owner's identifier, date and hour of image data inputting, and an imaging device identifier, sent from the image data registration apparatus 2 in response to the document retrieval request is received (step 809). As exemplified in Fig. 10, the message received at this time includes a message classification 903, a return code 905, and the number 907 of document names. The message also includes as many document name classes 909, document name involving character strings 911, document name involving image data 913, small card owner's identifiers 915, date and hour of image data inputting 917, imaging device identifiers 919, system file names 921, and network addresses 923 as correspond to the number 907 of document names.

Upon receiving the message from the image data registration apparatus 2, the return code 905 contained in the message is examined and it is determined whether access from the small card user is possible (step 811). If the result of decision at the step 811 is "no", then the fact that access to the specified file is impossible in order to ensure secrecy is displayed on the display device 17 (step 813), and the step 805 and the steps subsequent thereto are repetitively executed. If the result of decision at the step 811 is "yes", document names contained in the received message are displayed on the display device 17 (step 815). As document names contained in the received message, there are document names involving character string and document names involving image data. Its display method is not prescribed by the present invention. However, an example of its display is shown in FIG. 11. In FIG. 11, documents A and B having document names represented by character strings are shown.

Subsequently, specification of a document name by the user is inputted from the input device 18 (step 817). An input management table 601 containing the small card owner's identifier, date and hour of image data inputting, and imaging device identifier for the document name included in the received message is produced (step 819).

After execution of the step 819, or in case the result of decision at the step 801 is "yes", the user is inquired of about the insertion page number and the number of insertion pages, and answer from the user is inputted via the input device 18 (step 821). Finally, values indicated by the user and inputted at the step 821 are set in the insertion page number 611 and the number 613 of insertion pages of the input management table 601 (step 823).

Heretofore, image data input processing has been described. However, the portion ranging from the step 417 to the step 439 may be provided as a transmission processing program separated from the input processing program so that input processing of image data may be executed in parallel to the transmission processing of the image data. In this case, the image data inputted at the step 415 is stored in the memory 12 and thereafter the input processing program proceeds to the step 441 to wait for occurrence of a new event. In the transmission processing program, processing ranging from the step 415 to the step 439 is repetitively executed and image data held in the memory 12 are successively sent to the network 3.

Figure 12:
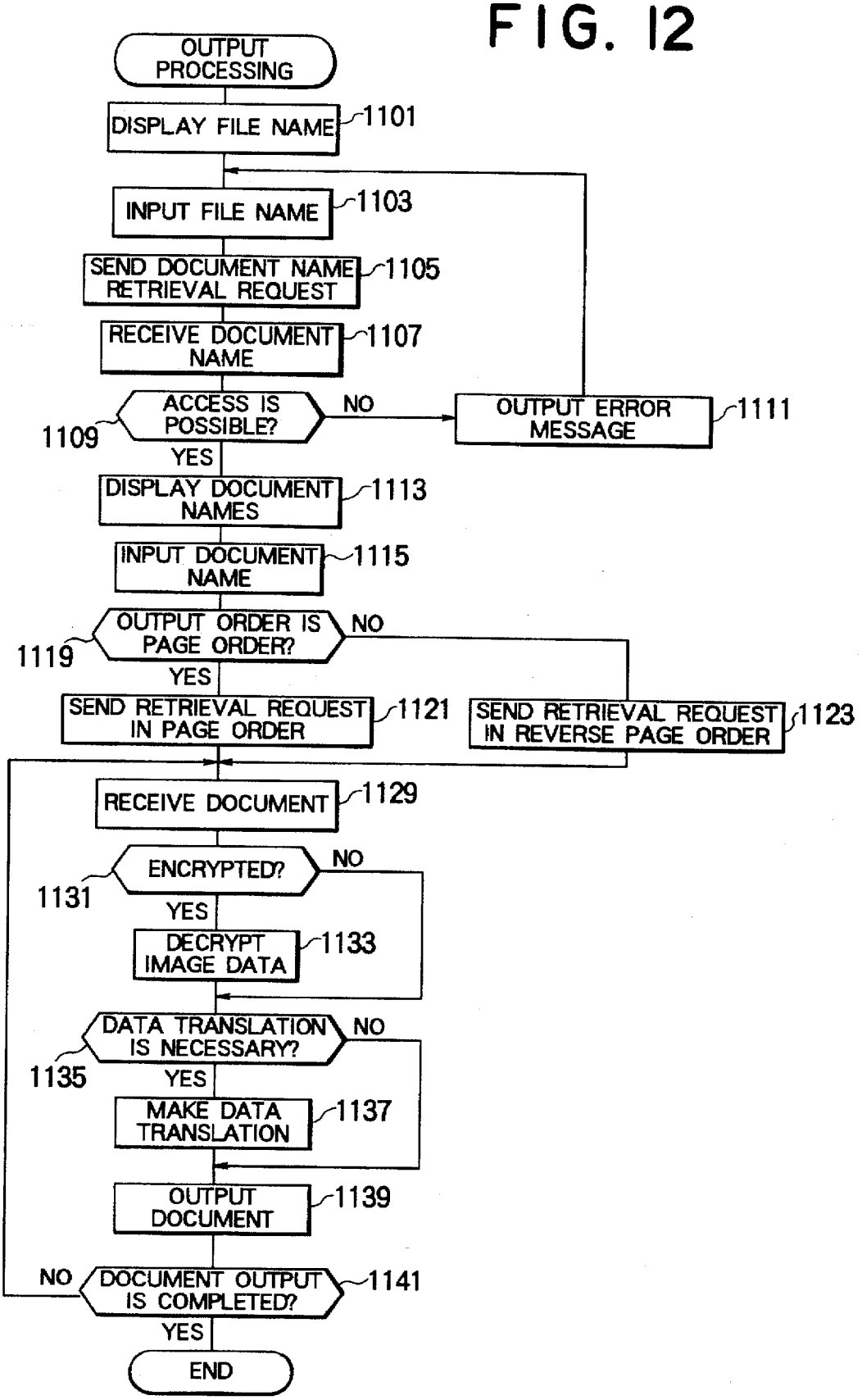
FIG. 12 is a flow chart of processing of an image data output processing module included in the input output program.

FIG. 12 shows the flow chart of output processing 213 illustrated in FIG. 3.

In the output processing, a file name read from the small card 32 is first displayed on the display device 17 (step 1101). Subsequently, specification of a file name made by the user is inputted from the input device 18 (step 1103), and a transmission message for requesting a document name contained in the file is sent to the network 3 (step 1105). The transmission message for requesting a document name is similar to the transmission message described before with reference to the step 807 in the insertion processing included in the input procesing.

Then the document names sent from the image data registration apparatus in response to the document name request are received (step 1107). It is determined whether those documents can be accessed by the user of the pertinent small card (step 1109). The message sent from the image data registration apparatus is similar to the message described before with reference to the step 809 in the insertion processing. If the result of decision at the step 1109 is "no", then the fact that access to the specified file is impossible in order to ensure secrecy is displayed on the display device 17, and thereafter the step 1103 and the steps subsequent thereto are repetitively executed (step 1111).

If the result of decision at the step 1109 is "yes", received document names are displayed on the display device 7 (step 1113). Then specification of a document name made by the user is inputted, and the specified document name is displayed with emphasis mode for the purpose of confirmation (step 1115). And it is determined whether the image data output device 15 is a device which prints image data in order of page (step 1119). This decision is made by the user when the program is installed in the image data input output device 15, or this decision is made on the basis of information stored in nonvolatile memory incorporated in the image data input output device 15.

Figure 13:
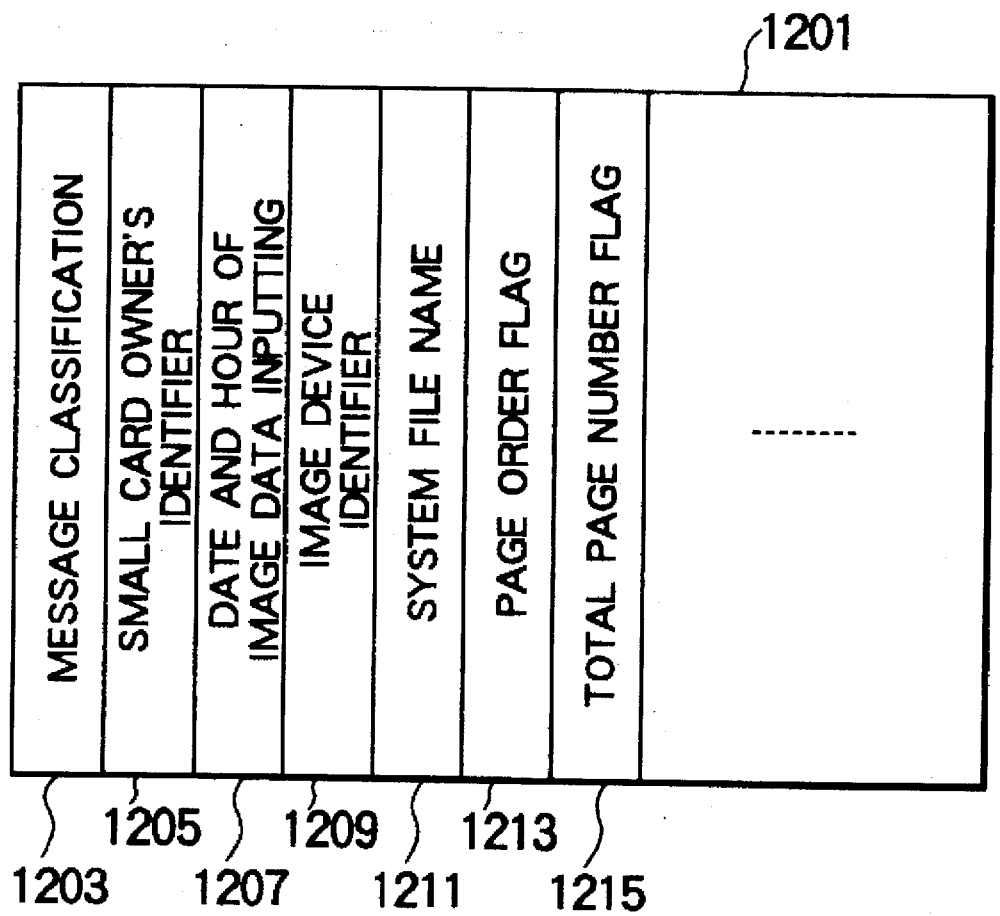
FIG. 13 is a logical configuration diagram of a message sent at the time of retrieval request.

If the result of decision at the step 1119 is "yes", a retrieval request for image data in page order is sent (step 1121). If the result of decision is "no", a retrieval request in reverse order is sent (step 1123). The logical configuration of a transmission message for retrieval request is exemplified in FIG. 13. The transmission message for retrieval request includes a message classification 1203, a small card owner's identifier 1205, date and hour of image data inputting 1207, an imaging device identifier 1209, a system file name 1211, a page order flag 1213, and a total page number flag 1215. In the message classification 1203, a value indicating the document retrieval request is set. In a range from the small card owner's identifier 1205 to the system file name 1211, data corresponding to the document name specified at the step 1115 and included in the received message received at the step 1107 are set. If at the step 1115 a command for outputting image data forming a document onto both faces of an output form is inputted as the output method in addition to specification of a document name given by the user, then the total page number flag in the retrieval request message is turned on at the step 1123 to make a request to send also the total number of pages of the document at the same time.

Destination of these retrieval requesting messages is specified by the network address corresponding to the pertinent document name contained in the message received at the step 1107.

Then, image data sent from the image data registration apparatus 2 in response to the retrieval requesting message are received (step 1129). It is determined whether the received image data have been encrypted (step 1131). If the received image data have been encrypted, the image data are sent to the electronic certification device 19 and decrypted (step 1133). Furthermore, it is checked whether data translation of image data is necessary (step 1135). As occasion demands, data translation is made (step 1137), and the received image data are printed and outputted by the image data input output device 15 (step 1139). If a command for outputting image data to both faces of an output form is given by the user at the step 115, the output device is a device which outputs image data in reverse page order, and the total number of pages of the received document is odd, then output is controlled so that the reverse side of the output form sent first, on the front of which image data have been printed, may become blank, and image data sent subsequently is printed on another output form. As a matter of course, it is also possible to adopt such processing that the user may specify the number of copies in printing besides the document name at the step 1115 and the document is printed on the basis thereof at the step 1139 to produce as many copies as specified.

Finally, it is determined whether outputting all pages has been finished (step 1141). If outputting has not been finished, then processing of the step 1129 and the steps subsequent thereto is repetitively repeated and the processing is finished.

Output processing has heretofore been described. However, it is also possible to make the processing ranging from the step 1131 to the step 1139 independent of other processing and execute printing processing in parallel to image data receiving processing (step 1129). In this case, the received image data are held in the memory 3 at the step 1129, and thereafter a jump to the step 1141 is made, and processing ranging from the step 1131 to the step 1139 is repetitively executed by using the image data held in the memory 3.

Figure 14:
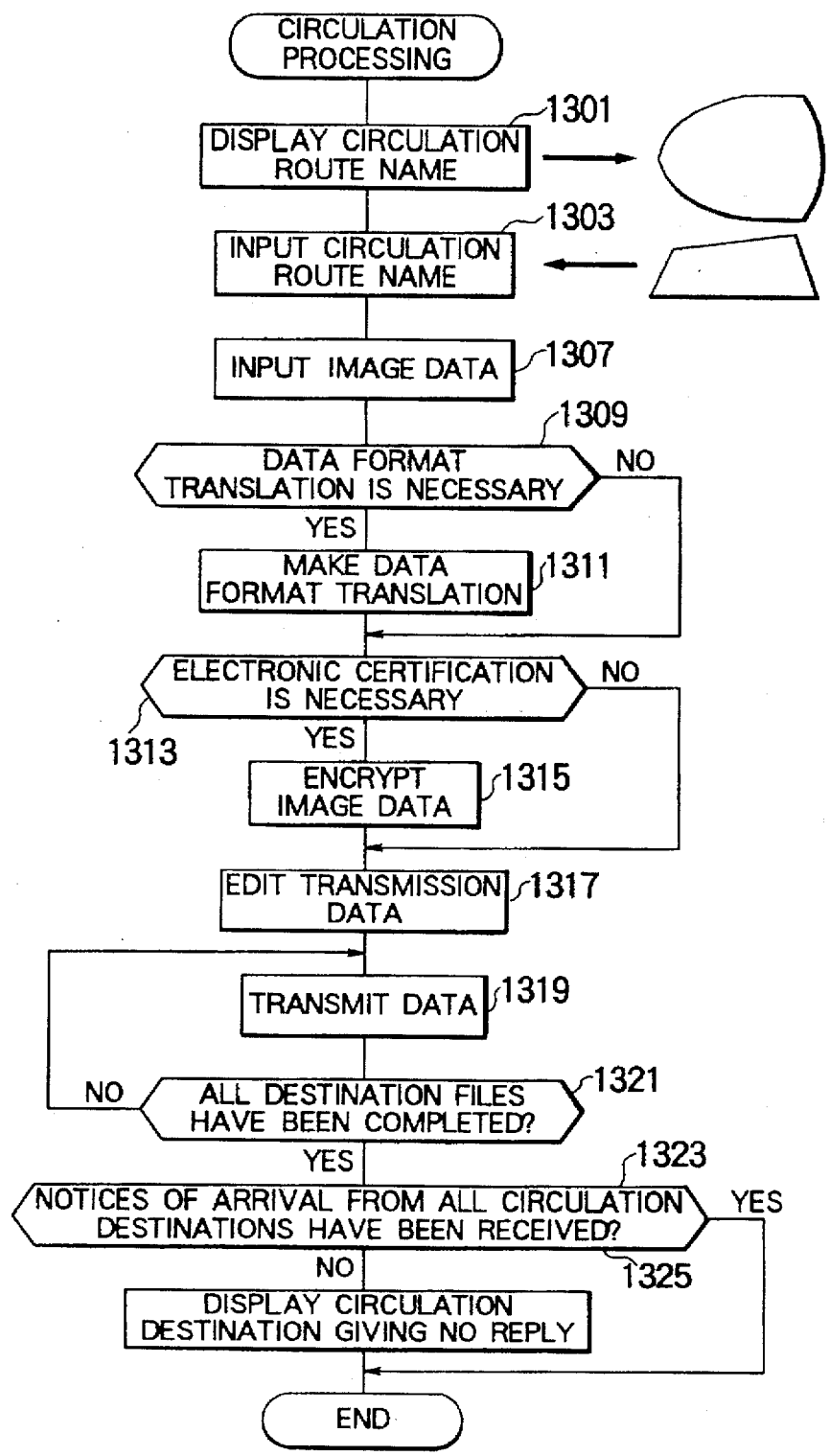
FIG. 14 is a flow chart of an image data circulating module included in the input output program.

FIG. 14 is a flow chart of circulation processing 217 shown in FIG. 3.

In the circulation processing, circulation route names read from the small card 32 is first displayed on the display device 17 (step 1301). Command of a circulation route given by the user via the input device 18 is inputted, and the specified circulation route name is displayed on the display device 17 with emphasis mode for the purpose of confirmation (step 1303).

In the same way as the image data input processing 209, image data are inputted from the image data input output device 15 (step 1307). It is checked whether data format translation is necessary (step 1309). As occasion demands, data format translation of the inputted image data is made by using the translation device (step 1311). Furthermore, it is checked whether encryption is necessary or not (step 1313). When encryption is necessary, the image data are sent to the electronic certification device 19 together with the secret key and encrypted (step 1015).

The image data thus inputted are edited into a circulation message (step 1317) and transferred to the image data registration apparatus 2 included in the specified circulation route (step 1319). The logical configuration of the circulation message is similar to that of registration request message and hence it will not be described. Subsequently, it is determined whether the circulation message has been transferred to all of circulation destinations. If there is a destination whereto the circulation message has not transferred yet, the step 1319 is repetitively carried out (step 1321). If the circulation message has been transferred to all destinations, then notices of arrival from the circulation destinations are waited for for a fixed period and it is determined whether notices have been received from all destinations (step 1323). If there is a circulation destination wherefrom notice of arrival has not received, then the circulation destination is displayed on the display device 17, and the processing is finished (step 1325). If it is detected at the step 1323 that the number of returned replies has become equivalent to the number of circulation destinations, then the fact that normal circulation has been made is displayed on the display device 17 without waiting for a fixed period, and the processing is finished.

Processing of the registration program 33 executed by the CPU 21 of the image data registration apparatus 2 will now be described in detail.

Figure 15:
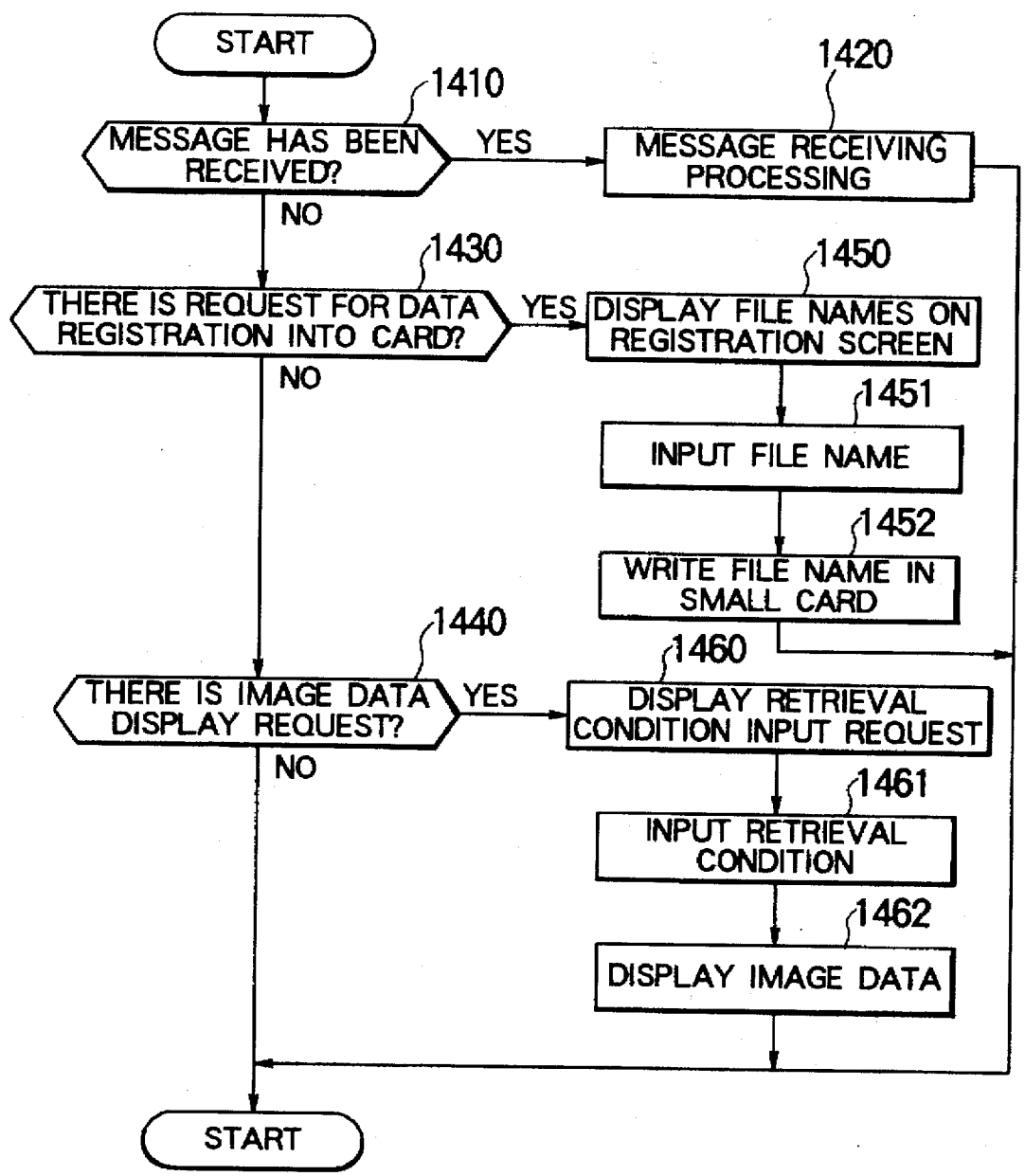
FIG. 15 is a flow chart of processing of a registering control program.

FIG. 15 shows the flow chart of the registration program 33.

Upon being informed of reception of a message from the image data input output apparatus 1 by the communication device 23, or in response to slipping a small card into the small card input output device 35 or an image data display request made by the keyboard 33, the CPU 21 activates the registration program and starts registration processing.

When the registration program 33 is started, the CPU 21 first determines whether the communication device 23 has received the message from the image input output apparatus 1 via the network 3 (step 1410). If the message has been received from the image input output apparatus 1, message receiving processing depending upon message contents is conducted (step 1420). If the message has not received at the step 1401, it is examined whether a request for data registration to the small card has been made by the input device 28 (step 1430). If there has been a registration request, then input requests, which includes data items such as display file names, system file names, and network addresses of image data registration apparatuses in which files are registered, are displayed on the image data display device 27 (step 1450). These data inputted via the input device 28 by the user are read (step 1451). Thereafter, each inputted data is written into a predetermined location of the small card and processing is finished (step 1452). At the step 1450, an alternative method may be used instead of the request for inputting a network address. In this alternative method, a combination of a physical network address of each image data registration apparatus and a logical identifier specifying the device, which is an identifier generally called host, is predetermined and stored. The user is requested to input this logical identifier, and the identifier is translated inside to a physical address of the network.

If the result of decision at the step 1430 is "no", then it is determined whether there has been an image data display request made via the input device 28 (step 1440). If there is an image data display request, then the user is requested via the image data display device 27 to input a retrieval condition (step 1460), and the retrieval condition specified by the user is inputted via the input device 28 (step 1461). On the basis of the retrieval condition, image data strored in the image data memory device 25 are retrieved and image data of the record corresponding to the retrieval condition are displayed by using the display device 31 (step 1462).

If the result of decision at the step 1440 is "no", procesing is finished. As occasion demands, however, other processing may be executed.

Figure 16:
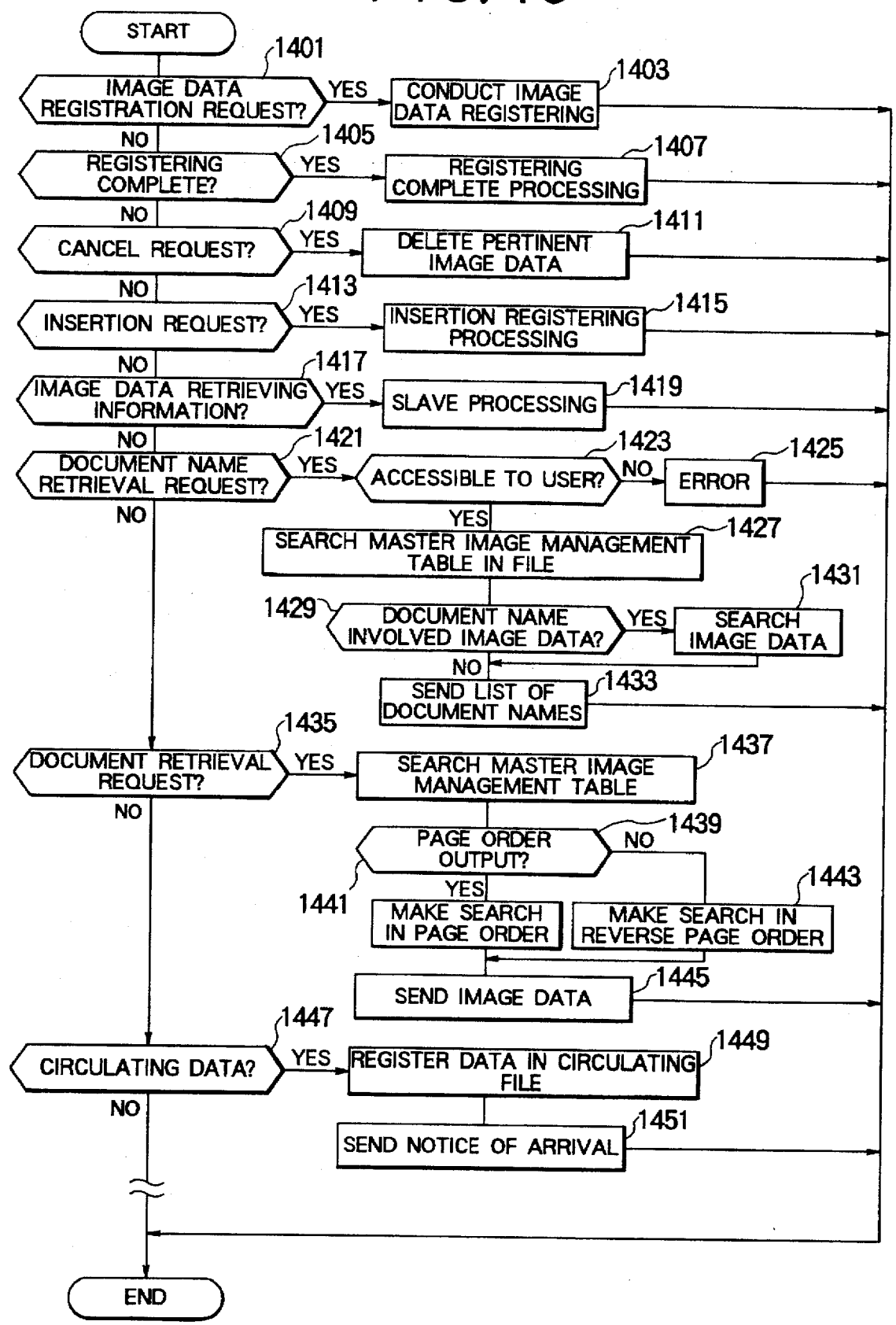
FIG. 16 is a flow chart of a message receiving process carried out by the registering control program.

FIG. 16 is a flow chart of message receiving processing conducted at the step 1420.

In the message receiving processing, it is first examined whether the received message is an image data registration request (step 1401). If the received message is a registration request, the received image data are registered in the image data memory device 29 as one record in the specified file (step 1403).

Figure 17:
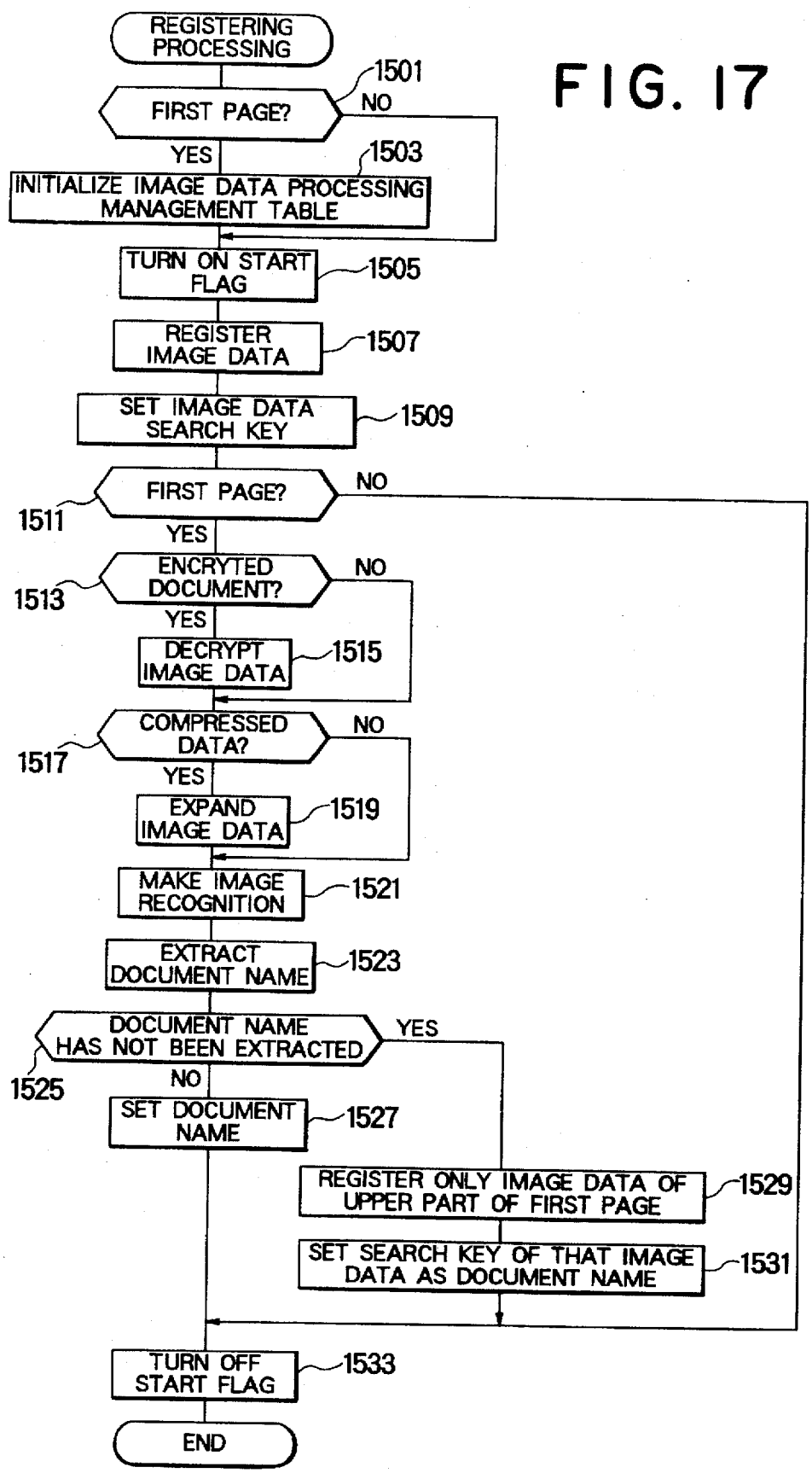
FIG. 17 is a detailed flow chart of an image data registering module in the message receiving process.

Registering processing conducted at the step 1403 will hereafter be described in detail by referring to FIG. 17.

It is determined whether received image data is the first page on the basis of the page number contained in the received message (step 1501). If the result of decision is "yes", then an initial value is set in the image data processing management table (step 1503), and the processing proceeds to step 1501. If the result of decision at the step 1501 is "no", the processing directly proceeds to the step 1501. As exemplified in FIG. 18, the image data processing management table includes a document name class 1601, a document name 1603, a small card owner's identifier 1605, date and hour of image data inputting 1607, an imaging device identifier 1609, a page number 1611, a start flag 1613, and an image data search key 1615. In the document name class 1601, a value indicating whether the data format of the document name involves a character string or image data is set. As for the small card owner's identifier 1605, date and hour of image data inputting 1607, imaging device identifier 1609, and page number 1611, corresponding information contained in the received message is copied.

At step 1505, a start flag 1613 contained in the image data processing management table is turned on (step 1505). Then the received image data are stored and registered in the image data memory device 29 (step 1507). If image data to be registered are present in a plurality of pages of the same document and there are a plurality of image data memory devices 29 registering the image data or there are memory devices capable of being accessed in parallel, then image data of consecutive pages are registered in different memory devices or memory devices capable of being accessed in parallel.

Subsequently, a search key for accessing the registered image data is set in the image data search key 1615 contained in the image data processing management table (step 1509). As for the search key, any one will do so long as it is one for taking out image data registered in the image data memory device. The present invention does not depend upon how to decide it. As for how to decide the search key, the conventionally known method for deciding the search key can be applied as it is and it will not be described herein.

Then it is determined again to decide the document name whether the image data is the first page (step 1511). If the result of decision is "no", then the document name has already been decided and hence the processing directly proceeds to step 1533, the start flag 1613 of the image data processing management table is turned off, and the processing is finished.

If the result of decision at the step 1511 is "yes", it is determined by referring to the encryption flag 727 contained in the received message whether the image data have been encryted (step 1513). If the image data have been encrypted, the image data are sent to the electronic certification device 18 and decrypted (step 1515). Furthermore, it is determined by referring to the registering data format 711 contained in the received message whether the image data have been compressed (step 1517). If the image data have been compressed, the image data are sent to the data translation device 19 and expanded therein (step 1519). Thereafter, the image data are sent to the image recognition device 17 and translated into code data (step 1521). A document name is extracted (step 1523). As for the method of translation from image data to code data in the image recognition device 17 and extraction of the document name from the code data, various conventionally known image recognition techniques can be used and hence detailed description thereof will be omitted.

Subsequently, it is determined whether a document name has been detected at the step 1523 (step 1525). If a document name has been extracted, then it is set in the document name 1603 of the image data processing management table and information indicating that the document name involves a character string is set in the document name class 1601 (step 1531). If a document name has not been extracted at the step 1523, a predetermined portion of the image data is extracted and it is registered in the image data memory device 29 instead of the document name (step 1527). Furthermore, the search key set at the step 1509 is set in the document name 1603 included in the image data processing management table, and information indicating that the document name involves image data is set in the document name class 1601 (step 1529). As for the information set as the document name at the step 1529, the small card owner's identifier, data and hour of image data inputting, or imaging device identifier may also be used instead of the search key.

Finally, the start flag 1613 included in the image data processing management table is turned off, and the registering processing is finished (step 1533).

Referring back to FIG. 16, if the received message is not an image data registering request, then it is determined whether the message is an input complete request of image data (step 1405). If the result of decision is "yes", registering complete processing is conducted in order to hereafter manage a group of image data, which have been registered in the registering request processing conducted before receiving the message, as one document (step 1407).

Figure 19:
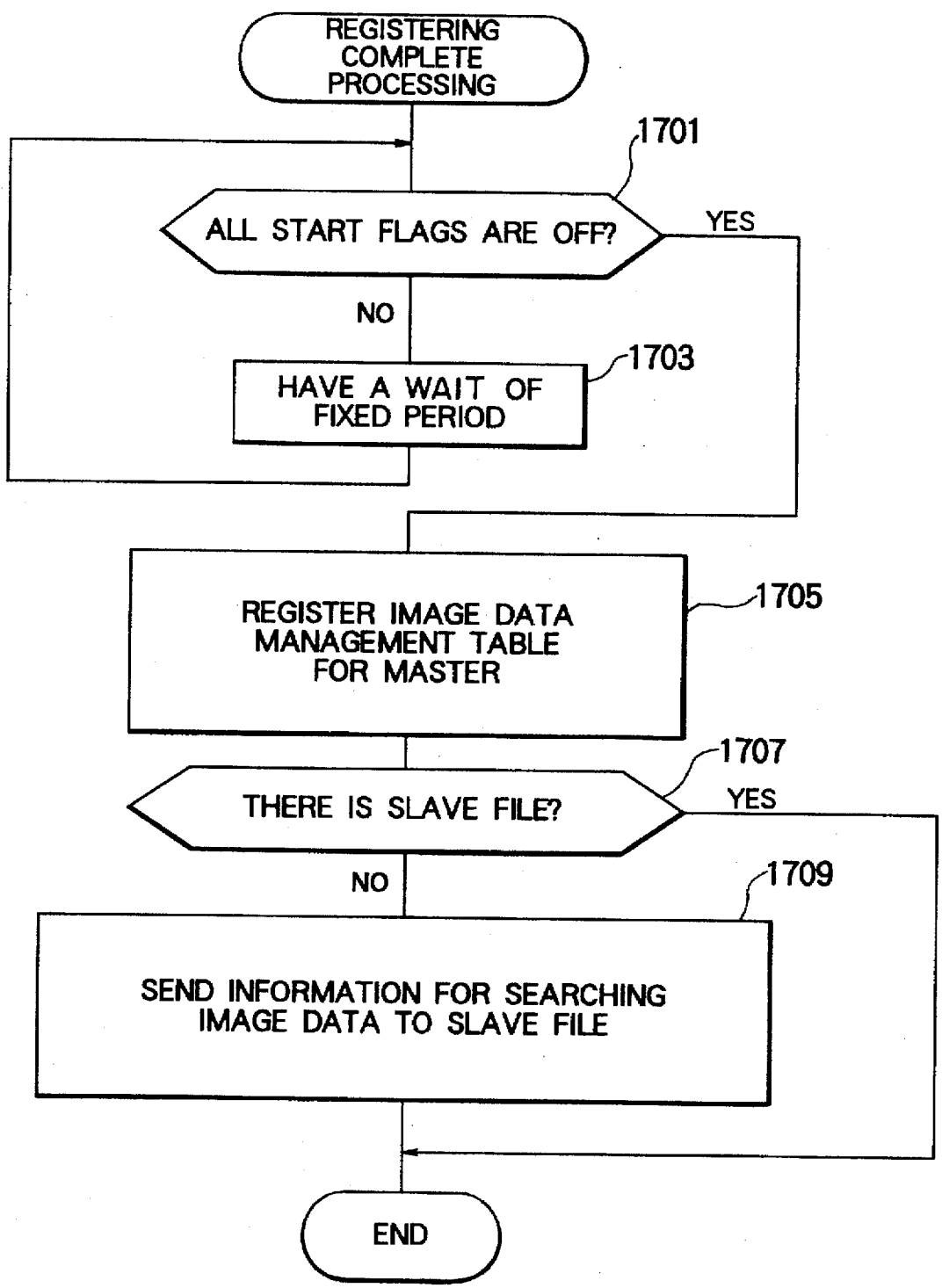
FIG. 19 is a flow chart of an image data registering completion module in the message receiving process.

The registering complete processing conducted at the step 1407 will hereafter be described in detail by referring to FIG. 19.

In the registering complete processing, it is first confirmed whether all start flags 1613 in the image data processing management table are off (step 1701). If the condition that all start flags 1613 are off is not satisfied, the start flags are checked again after a wait of a predetermined period (step 1703). If it is confirmed that all start flags 1613 are off, then an image data management record having a format for master file is generated. As exemplified in FIG. 20, the image data management record having a master file format includes a document name class 1803, a document name 1805, a small card owner's identifier 1807, date and hour of image data inputting 1809, an imaging device identifier 1811, a master-slave flag 1813, the total number 1815 of pages of image data, a page number 1817, and an image data search key 1819 of each page. In the master-slave flag 1813, information indicating whether the image data management record has a master file format or a slave file format is set. In each item of the image data management record, information of the corresponding item on the image data processing management table is copied. This image data management record having a master file format is registered into the image data memory device 29 by sorting the image data search key 1819 by using the page number 1817 (step 1705).

Then it is determined whether there is a slave file (step 1707). This decision is made by referring to the number 1610 of slave files included in the image data processing management table. If the number 1610 of slave files is 0, it is assumed that there are no slave files. If there is a slave file, processing is finished as it is. If there are no slave files, a document name is sent to a memory device indicated by a network address 1619 of slave file. Or the small card owner's identifier, date and hour of image data inputting, imaging device identifier, and a system file name 1617 of slave file set in the image data processing management table are sent to a memory device indicated by the network address 1619 of slave file in order to uniquely identify the document. The registering complete processing is thus finished (step 1709).

If the received message is not a registering complete request at the step 1405, it is determined whether the received message is a cancel request (step 1409). If the received message is a cancel request, then a group of image data, which has been received by an image data registering request received before the cancel request and which has not been subjected to registering complete processing yet, are deleted from the memory device (step 1411).

If the result of decision at the step 1409 is "no", it is determined whether the received message is an insertion request (step 1413). If the received message is an insertion request, image data accompanied by this request are inserted into a group of image data already stored (step 1415).

Figure 21:
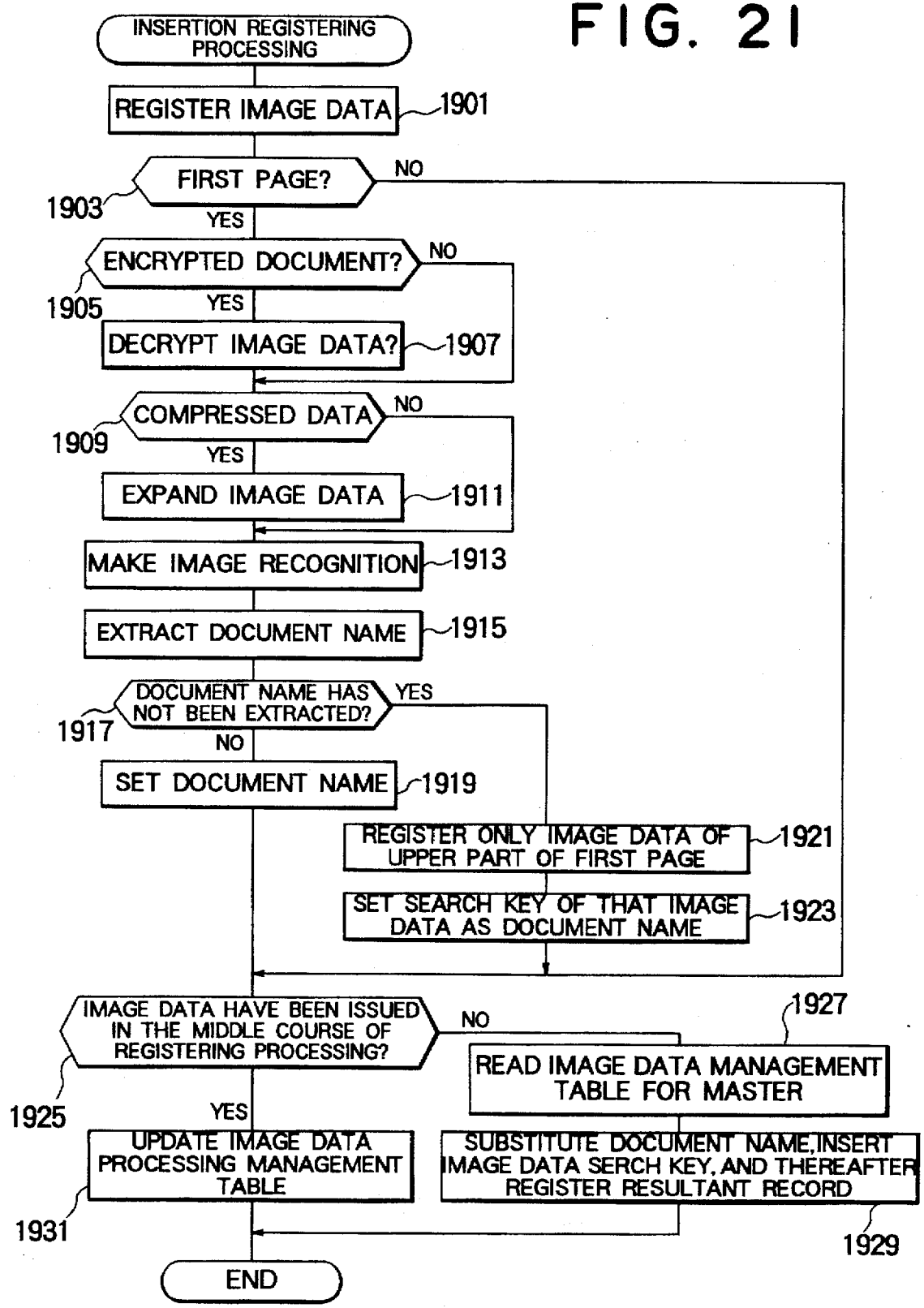
FIG. 21 is a flow chart of an inserting image data registering module in the message receiving process.
Figure 22:
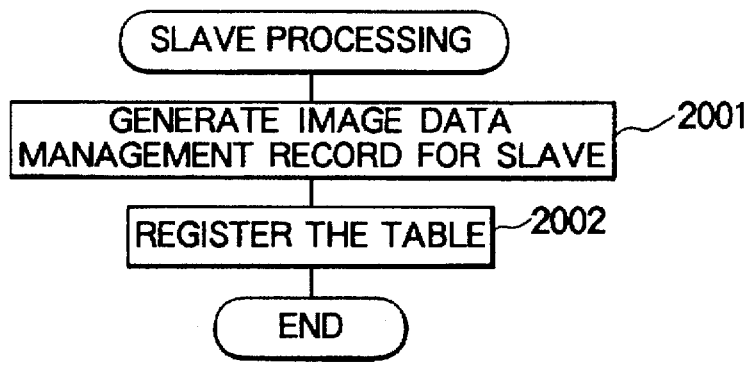
FIG. 22 is a flow chart of slave processing in the message receiving processing.

FIG. 21 shows the flow chart of insertion registering processing.

First of all, received image data are registered in the image data memory device 29 (step 1901). Thereafter, processing similar to that of the steps 1511 to 1531 of registering processing shown in FIG. 17 is conducted. Depending upon the image data subjected to the insertion request is the first page, extraction and setting of document name are conducted (steps 1903 to 1923). Thereafter, it is checked whether there is an image data processing management table having a small card owner's identifier, date and hour of image data inputting, and an imaging device identifier, which are identical with those contained in the received message. It is determined whether this insertion request has been issued in the middle course of registering processing (step 1925). If the result of decision at the step 1925 is "yes", then the same information as image data which are under registering processing is set in the image data processing management table for the image data as well, and the page number 1611 of the inserted page and pages subsequent thereto is moved down (step 1931). If the insertion request is made for a document, for which registering processing has already been finished, then the image data management record 1801 for that document is taken out from the image data memory device (step 1927). In that case, information concerning the inserted image data is set in the image data management record, and the page number of the inserted page and pages subsequent thereto is moved down. Thereafter, the record in the image data memory device is replaced by a resultant record (step 1929).

If the result of decision at the step 1413 is "no", it is determined whether the received message is image data retrieving information (step 1417). If this result of decision is "yes", then slave processing for managing an access key to image data is conducted, and the processing is finished (step 1419).

The slave processing will now be described in detail by referring to FIG. 21.

Figure 23:
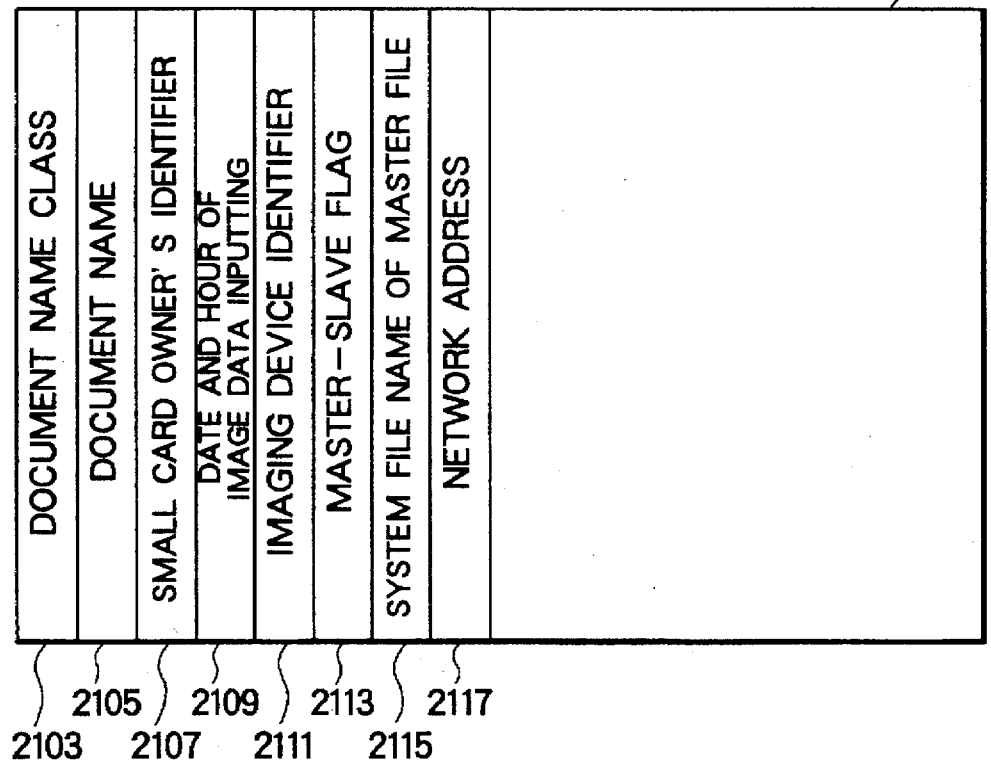
FIG. 23 is a logical configuration diagram of an image data management record having a slave file format.

An image data management record having a slave file format is generated and corresponding information of the received message is copied (step 2001). As exemplified in FIG. 23, the image data management record having a format for slave file includes a document name class 2103, a document name 2105, a small card owner's identifier 2107, date and hour of image data inputting 2109, an imaging device identifier 2111, a master-slave flag 2113, a system file name 2115 of master file, and a network address 2117 of master file.

This image data management record is registered in the image data memory device 29, and slave processing is finished (step 2003).

If the result of decision at the step 1417 is "no", it is determined whether the received message is a document name retrieval request (step 1421). If the received message is a document name retrieval request, it is determined on the basis of the small card owner's identifier sent together with the request whether it is document name retrieval of a file accessible to the user thereof (step 1423). If the result of decision is "no", then a message having information indicating that the file is not accessible set in the return code is sent to the image data input output apparatus 1 as an error message indicating that the file is not accessible, and the processing is finished (step 1425).

If the result of decision at the step 1423 is "yes", the image data management record of each document registered in the file is searched on the basis of the file name sent together with the request (step 1427). On the basis of document name class 1803 of the searched image data management record, it is determined whether the document name involves a character string or it involves image data (step 1429). Only in case the document name involves image data, image data corresponding to the document name is searched in the image data memory device 29 by using a search key set for the document name 1805 (step 1431). Finally, a list of document names in the specified file, small card owner's identifiers specifying documents, date and hour of image data inputting, and imaging device identifiers is sent to the image data input output apparatus 37, and processing is finished (step 1433).

If the result of decision at the step 1421 is "no", it is determined whether the received message is a document retrieval request (step 1435). If the received message is a document retrieval request, a search is made for the master image data management table of the specified document on the basis of the file name in the message, small card owner's identifier specifying the document, date and hour of image data inputting, and imaging device identifier (step 1437). It is determined whether the output is page order output or reverse order output by referring to the specification of page order in the message in the same way (step 1439). If the result of decision at the step 1439 is "yes", image data are successively searched by using the search key of each page of image data of the master image data management table in page order (step 1441). If the result of decision at the step 1439 is "no", image data are searched in reverse page order by using the search key of each page of image data in the same way (step 1443). Searched image data are successively sent to the image data input output apparatus 37, and the processing is finished (step 1445). If reply of the total number of pages of the document is requested, the total number 1815 of pages is also sent together with image data. The total number 1815 of pages may be unconditionally sent.

If the step 1445 for sending image data and image data retrieval processing are executed as separate tasks, processing time can be shortened by executing the retrieval processing and sending processing in parallel.

Furthermore, a plurality of retrieval processing tasks may be provided so that a plurality of pages of image data may be searched in parallel. As a matter of course, however, processing of sending image data individually searched in a specified page order is added at this time.

Furthermore, if the result of decision at the step 1435 is "no", it is determined whether the received message is a request for receiving circulating data (step 1447). If the result of decision is "yes", received image data are registered in a file specified in the request message. The registering processing executed at this time is similar to the registering processing executed at the step 1403, and hence the description thereof will be omitted (step 1449). Thereafter, notice of arrival of image data is sent to the image data input output apparatus 1, and the processing is finished (step 1451).

An embodiment of the present invention has heretofore been described. In the present embodiment, it is possible to use information registered in a portable memory device which can be carried by each individual, sort information imaged on the basis of this information into files, register the sorted information in a memory device included in the network, and manage the information. If the user knows only the classification of needed files, therefore, the user need not know information heretofore needed to be known in order to use information registered in the network, such as a network address for uniquely specifying each file in the network, a host name, or a directory hierarchy, and a file name which is unique in the system when the user accesses the image data. Furthermore, the user need not know manipulation methods for making possible access to a file such as remote log-in or allocation. It is thus possible to provide image data management service facilitating manipulation. In case there are a plurality of destinations of image data in the network, this effect becomes more significant.

In addition, a file name and a network address, or, a host name, a directory hierarchy exhibited to the user, and a unique combination of them with a file name, or information for taking the combination on the network are registered on a portable memory device such as a small card. When image data are to be registered or read out, the above described information is read out. Even if an input output device used for image data or a work station using the registered image data is not fixedly decided, therefore, an input output device or a work station can be customized for exclusive use of the user by inserting the portable memory device.

Furthermore, in case the same image data are to be registered in a plurality of files, it is possible to specify a master file for registering image data itself therein and as many slave files for managing only pointers to the image data as the number of files. Therefore, the file can be used so that image data themselves may be registered in a file common to a certain division whereas only a pointer to an individual may be registered in a file for the individual. Therefore, it is possible to lighten the registration manipulation for possessing image data in both the common file and individual file. Furthermore, it is effective in case the memory device for the individual file has a small capacity.

Furthermore, by translating image data to code data and extracting a document name in a registration apparatus having a main file, and sending an extracted document name to a slave file, overlap of processing for image recognition and document name extraction can be avoided.

Furthermore, when image data are registered, information indicating whether encryption has been performed is also displayed together with a list of files. For documents having a high degree of secrecy, it is possible to make the user select files to be encrypted, encrypt the selected files by using the electronic certification method, and send and register the files. Furthermore, in case registering in a file to be encrypted and registering in a file not to be encrypted are simultaneously requested, the reliability can be improved by deterring the request.

By registering a principal part of management information registered on a small card in the image data registration apparatus and registering a small card owner's identifier, a network address indicating the image data registration apparatus which is the registering destination of management infomation, and a system file name, for example, on the small card, the present invention can be sufficiently applied even if the small card has a small memory capacity. In this case, prior to the input processing described before with reference to FIG. 5, the image data registration apparatus is inquired of about management information corresponding to the small card owner's identifier, on the basis of information registered on the small card of the user who has requested image data inputting, and input processing is conducted on the basis of reply information from the image data registration apparatus. At this time, in the message receiving processing described before with reference to FIG. 16, it is a matter of course that retrieval processing for management information corresponding to the small card owner's identifier in the memory device is added in response to an inquiry request of management information.

In the above described embodiment, it is possible to provide an image recognition device in the image data input output apparatus, execute the document name extraction processing (steps 1521 to 1523) in the registering processing described before with reference to FIG. 17 after the step 415 of the input processing described before with reference to FIG. 5, and send the document name as well when image data are sent to the main file at the step 439. In this case, sending information for searching image data to the slave file (steps 1707 to 1709) included in the registering complete processing described before with reference to FIG. 19 is carried out after the step 439 shown in FIG. 5. Furthermore, in the processing (step 1531 or 1527) of setting a document name into the image data processing management table or image data management record in the registering processing, the document name contained in the message sent from the image data input output apparatus may be set in the pertinent place thereof.

In case there are a master file and a slave file, therefore, management information of image data can be sent from the image data input output apparatus directly to the slave file. As a result, the load of processing in the image data registration apparatus is reduced. Accordingly, response performance to inquiry from the image data input output apparatus can be improved.

Figure 24:
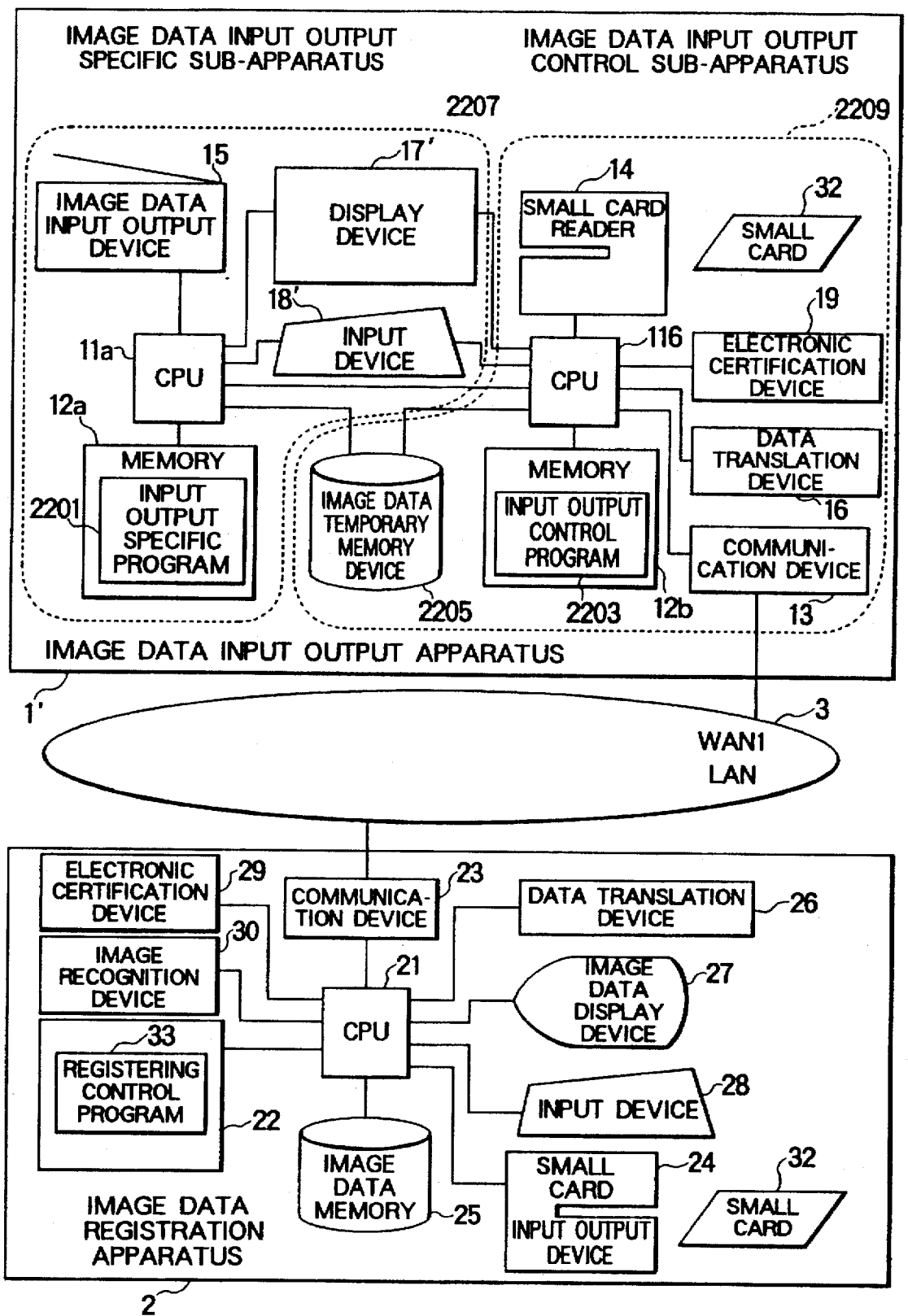
FIG. 24 is an entire configuration diagram of an image data management system which is a second embodiment of the present invention.

FIG. 24 is a configuration diagram of a second embodiment of an image data management system according to the present invention. In FIG. 24, components common to those of the first embodiment are denoted by the same numerals as those of FIG. 1. The configuration of the present embodiment differs most from that of the first embodiment in that an image data input output apparatus 1' includes two sub-apparatuses, i.e., an input output specific sub-apparatus 2207 and an input output control sub-apparatus 2209. The input output specific subapparatus 2207 includes a CPU 11a, a memory 12a storing an input output specific program 2201, an image data input output device 15, a display device 17', and an input device 18'. The input output control sub-apparatus 2209 includes a CPU 11b, a memory 12b storing an input output program 2203, a communication device 13, a small card reader 14, a data translation device 16, an electronic certification device 19, and an image data temporary memory device 2205. The display device 17', input device 18', and image data temporary memory device 2205 are connected to both CPU 11a and 11b, and are shared by them. The image data temporary memory device 2205 temporarily stores image data delivered between the input output specific sub-apparatus 2207 and the input output control sub-apparatus 2209. As the image data temporary memory device 2205, an external memory device such as a semiconductor memory device or a magnetic disk device, or a memory device such as a main memory device or an extended memory device may be used. The configuration of the image data registration apparatus 2 is identical with that of the first embodiment.

Figure 25:
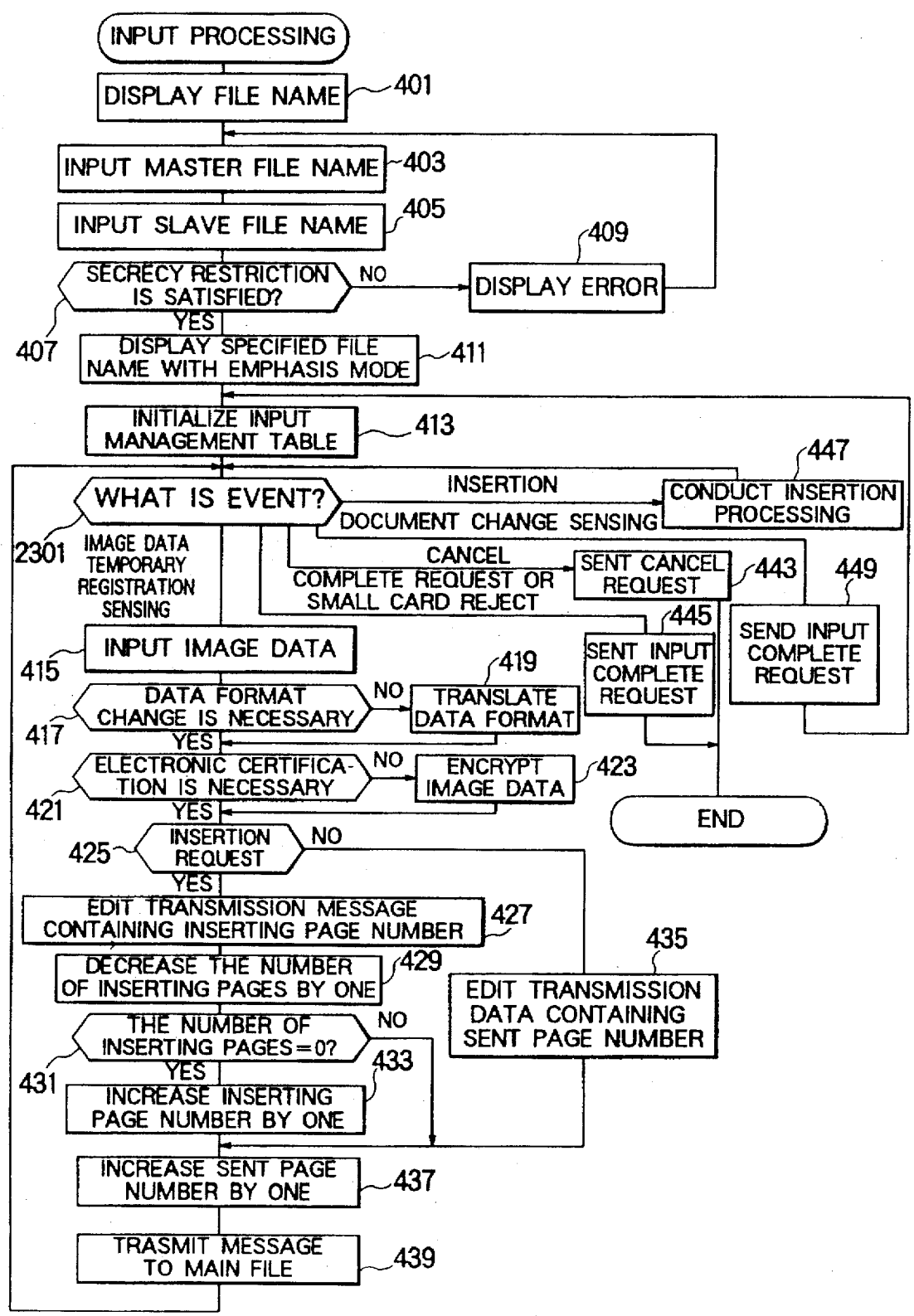
FIG. 25 is a flow chart of input processing in the second embodiment.

The processing of the input output control program 2203 executed by the CPU 11b is fundamentally identical with the processing in the first embodiment shown in FIG. 2 with the exception of the input processing and output processing. First of all, the input processing will be described by referring to FIG. 25.

Steps 401 to 413 of the input processing in the present embodiment are identical with those of the input processing in the first embodiment, and will not be described.

In the input processing in the present embodiment, the input management table is initialized (step 413) and subsequently the event which has occurred is judged (step 2301). Events judged at the step 2301 include sensing temporary registration of image data into the image data temporary memory device 2205 besides events judged at the step 441 in the first embodiment. Upon sensing temporary registration of image data, the CPU 11b conducts input processing including steps 415 to 439. Processing conducted at these steps is identical with that of the first embodiment excepting that image data are inputted from the image data temporary memory device 2205 instead of the image data input output device at the step 415.

At step 2301, temporary registration of image data is sensed by receiving notice of registration of image data into the image data temporary memory device 2205 sent from the input output specific sub-apparatus 2207. The temporary registration of image data may be sensed by the CPU 11b, which gains access to the image data temporary memory device 2205 at regular intervals and determines whether image data to be sent to the image data registration apparatus 39.

Processing conducted when an event other than sensing temporary registration of image data is identical with that of the first embodiment and its description will be omitted.

On the other hand, output processing conducted by the input output control program is identical with that of the first embodiment excepting that processing at the step 1139 of the output processing in the first embodiment is changed into writing image data into the image data temporary memory device 2205 and notice to the image data input output specific sub-apparatus, and description thereof will be omitted.

Figure 26:
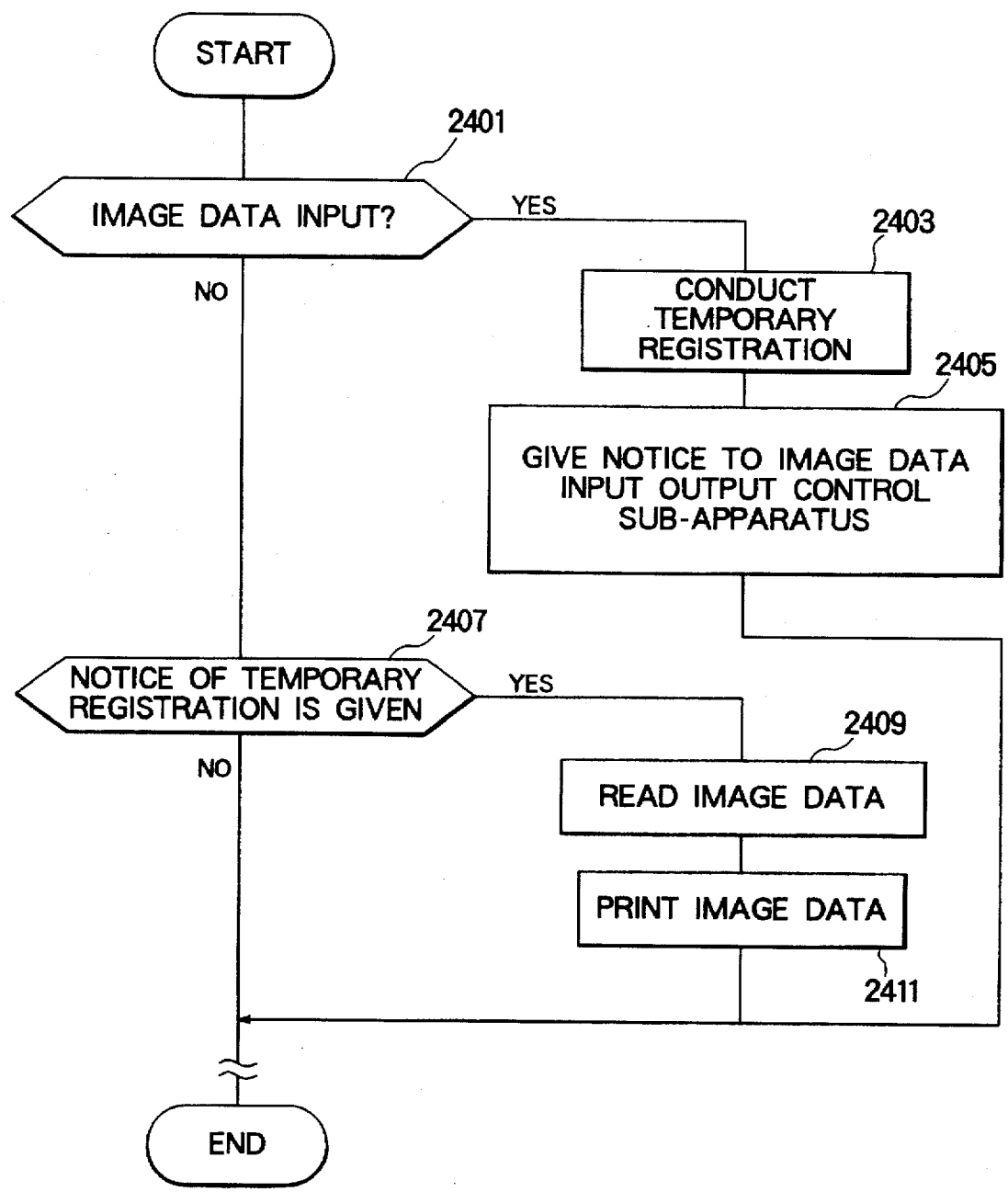
FIG. 26 is a flow chart of an input output specific processing program of image data.

Processing of the input output specific program 2201 will now be described by referring to FIG. 26.

When image data are inputted by the image data input output device 15, or when notice of registration of output data into the image data temporary memory device has been received from the input output control sub-apparatus 2209, the input output specific sub-apparatus 2207 starts execution of the input output specific program 2201.

First of all, it is determined whether start of the input output program 2201 is caused by input of image data to the image data input output device 15 (step 2401). If the result of decision is "yes", then image data read from the image data input output device 15 are registered into the image data temporary memory device 2205 (step 2403), notice of temporary registration of the image data is given to the input output control sub-apparatus 2203, and the processing is finished (step 2405).

If the result of decision at the step 2401 is "no", it is determined whether notice of temporary registration of image data has been given by the input output control sub-apparatus 2209 (step 2407). If the result of decision is "yes", then image data registered in the image data temporary memory device 2205 is read (step 2409), the image data are sent to the input output device 15 and printed, and the processing is finished (step 2411).

In the present embodiment, the input output specific sub-apparatus 2207 reads data from the image data temporary memory device 2205 in response to notice given by the input output control sub-apparatus 2209 at the time of image data outputting. Alternatively, the input output specific sub-apparatus 2207 may gain access to the image data temporary memory device 2205 at regular intervals, check whether image data to be outputted has been registered therein. If there are image data to be outputted in this case, the input output specific sub-apparatus 2207 reads the image data (step 2409) and prints the image data (step 2411).

A third embodiment of the present invention will now be described.

In the present embodiment, image data in the image data management system described with reference to the first or second embodiment are registered into a data base and managed. The present embodiment will now be described assuming that data bases are relational data bases. However, the present embodiment can be similarly implemented in other data bases as well.

The entire system configuration is identical with that of the first embodiment shown in FIG. 1 or the second embodiment shown in FIG. 24 with the exception of points which will be hereafter described.

As exemplified in FIG. 27, a small card of the present invention contains information of a small card owner's identifier 2503, the number 2505 of data bases, a data base name 2507 for display, a data format 2509 to be used when registering image data, a secret key 2511 for electronic certification, a network address 2515 of the image data registration apparatus 2 including a memory device storing the file, a data base name 2513 defined in the system, the number 2517 of tables, a table name 2519 for display, a table name 2521 defined in the system, the number 2523 of columns, a column name 2525 for display, and a column name 2527 defined in the system.

In the present embodiment, processing conducted in the first embodiment by using a file name is conducted by using the data base name for display, table name for display, and column name for display. As for each processing in the present embodiment, only portions differing from the processing described before with reference to the first embodiment will hereafter be described.

Among various kinds of processing conducted by the input output program in the present embodiment, input processing and output processing differ from those of the first embodiment in the following points.

First of all, as for the input output processing, processing at the step 401 in the flow chart of FIG. 5 is changed from file name display to display of the display data base name 2507, display table name 2519, and display column name 2525, and processing at the step 403 is changed from selection of a file name by the user to selection of the data base name, table name, and column name. Furthermore, the transmission processing at the step 439 is changed so that a registering request message having a specified data base name for system, table name for system, and column name for system instead of the file name may be changed and sent to the network 3.

In the same way, as for the output processing, the processing at the step 1101 in the flow chart of FIG. 12 is changed from file name display to display of the data base name 2507 for display, table name 2519 for display, and the column name 2525 for display, and the processing at the step 1103 is changed from selection of a file name by the user to selection of the data base name, table name, and column name. The transmission processing of the retrieval request message at the step 1121 or 1123 is changed so that a retrieval request message having a specified column name for system may be generated and sent to the network 3.

On the other hand, the same is true of the processing conducted by the image data registration program. The processing is conducted on the basis of the data base name, table name, and column name contained in the received message instead of the file name contained in the received message. Image data registration conducted at the step 1507 of FIG. 16 is changed from file registration to data base registration. At this time, the small card owner's identifier, date and hour of image data inputting, or imaging device identifier is used as the key for uniquely specifying each line of the table. In the same way, the image data search processing conducted at the step 1429 or 1431 of FIG. 15 is also changed to search processing conducted from the data base. As for the search key at this time, the small card owner's identifier, date and hour of image data inputting, or imaging device identifier is used.

In processing for registering data into the small card and image data display processing as well, it is a matter of course that processing with a file taken as the unit is changed to processing based upon the data base name, table name, and column name.

Owing to the present embodiment, image data can be registered as data of a data base and used.

According to the present invention heretofore described, files for registering image data therein are classified by taking an individual such as a small card owner as the unit, and the files are provided with unique file names in that classification. By only making the user select a file for registering image data out of those files, image data can be registered. As a result, image data management service facilitating manipulation can be provided.

We claim:

1. An image data management system comprising:

a communication circuit network;

an image data input output apparatus connected to said communication circuit network, said image data input output apparatus including:

an image input device for taking in information represented on paper as image data;

a management information input device for reading image data management information from a IC card, said image data management information being needed to register and manage image data inputted from said image input device;

an input device for inputting command information given by a user; and an input output processing device for processing image data inputted from said image input device and sending processed image data onto said communication circuit network, on the basis of the command information inputted from said input device and the image data management information read from said management information input device, wherein accessing of image data from said communication circuit network is made possible by reading file name information stored in the IC card; and an image data registration apparatus connected to said communication circuit network to register image data sent from said image data input output apparatus, said image data registration apparatus including:

a memory device for registering image data sent from said image data input output apparatus; and an image data registering device for taking in image data on said communication circuit network, providing image data thus taken in with search information needed at the time of searching said image data, and registering the image data with the search information attached thereto in said memory device.

2. The image data management system according to claim 1, wherein said image data management system includes a plurality of said image data registration apparatuses, and said input output processing device selects an image data registration apparatus out of said plurality of image data registration apparatuses as destination of transmission on the basis of said image data management information and said command information and sends said image data toward the selected image data registration apparatus.

3. The image data management system according to claim 1, wherein said input output processing device sends an owner's identifier included in said image data management information to identify the owner of said IC card to said image data registration apparatus together with said image data, and said image data registering device uses said owner's identifier sent together with said image data as said search information.

4. The image data management system according to claim 1, wherein said input output apparatus includes data translation means for translating the format of image data inputted from said image input device into a image data format specified by said image data management information.

5. The image data management system according to claim 4, wherein said data translation means translates inputted color image data into monochrome image data.

6. The image data management system according to claim 4, wherein said data translation means translates data density of inputted image data.

7. The image data management system according to claim 1, wherein said input output processing device includes means for encrypting image data inputted from said input device by using an encryption key contained in said image data management information.

8. The image data management system according to claim 1, wherein said input output processing device conducts processing of inputting image data from said input device and processing of sending inputted image data to said communication circuit network as mutually independent tasks.

9. The image data management system according to claim 1, wherein said image data registering device conducts processing of receiving image data from said communication circuit network and processing of registering received image data into said memory device as mutually independent tasks.

10. The image data management system according to claim 1, wherein said image data management information includes:

a plurality of first file names uniquely identified in said memory device having said image data management information registered therein;

second file names respectively associated with said plurality of first file names, said second file names each uniquely identifying a file having said image data registered therein in said image data registration apparatus; and a network address for identifying an image data registration apparatus holding a file identified by said second file name.

11. The image data management system according to claim 10, wherein said command information includes one of said plurality of first file names, and said input output processing device searches a network address associated with the first file name specified by said command information, and decides an image data registration apparatus as destination of said image data on the basis of a result of the search.

12. The image data management system according to claim 10, wherein said image data registration apparatus holds a plurality of image data sets respectively belonging to different groups in a file identified by said second file name, and each image data set is provided with a document name identifying a group whereto the image data set belongs and stored in said memory device.

13. The image data management system according to claim 12, wherein said image data registration apparatus further includes an image recognition device for discriminating contents of said image data, and said image data registration apparatus extracts a document name of a group whereto said image data belongs on the basis of a result of recognition of at least a part of said image data made by said image recognition device.

14. The image data management system according to claim 12, wherein in case said image recognition device cannot recognize said image data, a predetermined part of said image data is used as said document name.

15. An image data management method in an image data management system including a communication circuit network, an image data input output apparatus connected to said communication circuit network to input and output image data, and an image data registration apparatus connected to said communication circuit network to register image data sent from said image data input output apparatus, said image data management method comprising the steps of:

taking in information represented on paper as image data in said image data input output apparatus;

reading image data management information from a IC card, said image data management information being needed to register and manage said image data taken in;

inputting command information given by a user;

sending said image data onto said communication circuit network, on the basis of said inputted command information and the image data management information;

taking in image data existing on said communication circuit, in said image data registration apparatus;

providing image data taken in with search information needed at the time of searching said image data, and registering the image data with the search information attached thereto in a memory device; and accessing image data over said communication circuit on the basis of file name information stored in the IC card.

16. The image data management method according to claim 15, wherein said image data management information reading step includes step of reading as said image data management information, information including:

a plurality of first file names uniquely identified in said memory device;

second file names respectively associated with said first file names, said second file names each uniquely identifying a file having said image data registered therein in said image data registration apparatus;

network addresses respectively associated with said first file names, said network addresses each identifying an image data registration apparatus holding a file identified by said second file name; and an owner's identifier for identifying the owner of said memory device.

17. The image data management method according to claim 16, wherein said command information inputting step includes the steps of:

displaying said plurality of first file names on a display device; and inputting command information for specifying at least one file name out of said first file names.

18. The image data management method according to claim 17, wherein said image data sending step includes the steps of:

extracting a second file name and a network address associated with a first file name specified by said command information; and attaching said extracted second file name to said image data, and sending said image data with said second file name to said image data registration apparatus identified by said extracted network address.

19. The image data management method according to claim 18, wherein said registering step includes the steps of:

conducting recognition processing of received image data, and determining a document name of said image data on the basis of a result of said recognition; and registering said image data into a file held in said memory device together with said document name and identified by said second file name.

20. The image data management method according to claim 19, further comprising the steps of:

accepting, in said image data input output apparatus, a retrieval request specifying said first file name made by the user;

extracting a second file name and a network address associated with the first file name requested to retrieve, and sending a retrieval request message containing said second file name and requesting retrieval of image data to said image data registration apparatus identified by the extracted network address;

receiving, in the image data registration apparatus identified by said network address, said retrieval request message;

retrieving a file held in said memory device and identified by the second file name contained in said received message, and extracting document names registered in said file; and sending a retrieval reply message containing the extracted document names to said image data input output apparatus.

21. The image data management method according to claim 20, further comprising the steps of:

receiving, in said image data input output apparatus, said retrieval reply message and displaying said document names on the display device;

accepting command information indicating at least one document name specified out of displayed document names by the user;

sending an output request message containing the document name specified by said command information and requesting output of image data provided with said document name to the image data registration apparatus wherefrom said retrieval reply message has been sent;

receiving, in the image data registration apparatus wherefrom said retrieval reply message has been sent, said output request message;

retrieving a file registered in said memory device, and reading out image data with a document name contained in said output request message attached thereto; and sending said image data to the image data input output apparatus wherefrom said output request message has been sent.

* * * * *